(12) United States Patent
Ma et al.

(10) Patent No.: US 12,231,696 B2
(45) Date of Patent: Feb. 18, 2025

(54) LOOP FILTERING METHOD AND DEVICE

(71) Applicant: SZ DJI TECHNOLOGY CO., LTD., Shenzhen (CN)

(72) Inventors: Siwei Ma, Shenzhen (CN); Xuewei Meng, Shenzhen (CN); Xiaozhen Zheng, Shenzhen (CN); Shanshe Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 158 days.

(21) Appl. No.: 17/645,813

(22) Filed: Dec. 23, 2021

(65) Prior Publication Data

US 2022/0116664 A1 Apr. 14, 2022

Related U.S. Application Data

(63) Continuation of application No. PCT/CN2019/092868, filed on Jun. 25, 2019.

(51) Int. Cl.
*H04N 19/82* (2014.01)

(52) U.S. Cl.
CPC .................................. *H04N 19/82* (2014.11)

(58) Field of Classification Search
CPC ...... H04N 19/82; H04N 19/117; H04N 19/13; H04N 19/147; H04N 19/176; H04N 19/1887; H04N 19/196; H04N 19/70; H04N 19/91; H04N 19/61; H04N 19/184; H04N 19/186
USPC .................................................... 375/240.29
See application file for complete search history.

(56) References Cited

U.S. PATENT DOCUMENTS

| | | |
|---|---|---|
| 10,313,675 B1 | 6/2019 | Lin et al. |
| 2011/0222607 A1 | 9/2011 | An et al. |
| 2013/0328705 A1 | 12/2013 | Wang et al. |
| 2015/0131717 A1 | 5/2015 | Min et al. |
| 2015/0189298 A1 | 7/2015 | Ye et al. |
| 2018/0091812 A1 | 3/2018 | Guo et al. |
| 2018/0262765 A1 | 9/2018 | Bordes et al. |
| 2020/0329239 A1* | 10/2020 | Hsiao ..................... H04N 19/70 |
| 2020/0396452 A1* | 12/2020 | Hu ......................... H04N 19/46 |
| 2021/0314628 A1* | 10/2021 | Zhang .................. H04N 19/174 |

FOREIGN PATENT DOCUMENTS

| | | |
|---|---|---|
| CN | 102665077 A | 9/2012 |
| CN | 102724506 A | 10/2012 |
| CN | 104126301 A | 10/2014 |
| CN | 104205830 A | 12/2014 |
| CN | 104735450 A | 6/2015 |
| CN | 105791877 A | 7/2016 |

(Continued)

OTHER PUBLICATIONS

Lim et al. ("Non-CE5: Simplification on ALF clipping parameter coding", JVET-O0058-v1, Jun. 18, 2019). (Year: 2019).*

(Continued)

*Primary Examiner* — Matthew K Kwan
(74) *Attorney, Agent, or Firm* — ANOVA LAW GROUP, PLLC

(57) ABSTRACT

The present disclosure provides a loop filtering method which includes determining a clip index parameter of a loop filter, and encoding the clip index parameter by using a non-exponential Golomb encoding method.

20 Claims, 12 Drawing Sheets

(56) References Cited

FOREIGN PATENT DOCUMENTS

| CN | 109076219 A | 12/2018 |
|---|---|---|
| CN | 109417639 A | 3/2019 |
| CN | 109479130 A | 3/2019 |
| CN | 109565594 A | 4/2019 |
| CN | 109862374 A | 6/2019 |
| CN | 113940085 A | 1/2022 |
| CN | 114145019 A | 3/2022 |
| EP | 3471413 A1 | 4/2019 |
| EP | 3915253 A1 | 12/2021 |
| EP | 3954121 A1 | 2/2022 |
| EP | 3984233 A1 | 4/2022 |
| WO | 2017045580 A1 | 3/2017 |
| WO | 2019072582 A1 | 4/2019 |

OTHER PUBLICATIONS

Hu et al. ("Non-CE5: Modification of clipping value signalling for adaptive loop filter", JVET-O0064-v1, Jun. 17, 2019). (Year: 2019).*
Zhang et al. ("Non-CE5: Modified coding method for ALF clipping parameters", JVET-O0067-v1, Jun. 18, 2019). (Year: 2019).*
Bross et al. ("Versatile Video Coding (Draft 5)", JVET-N1001-v8, Jun. 11, 2019). (Year: 2019).*
McCann Ken et al., "HM5: High Efficiency Video Coding (HEVC) Test Model 5 Encoder Description, Joint Collaborative Team on Video Coding", Joint Collaborative Team on Video Coding (JCT-VC) of ITU-T SG16 WP3 and ISO/IEC JTC1/SC29/WG11, 7th Meeting: Geneva, CH, Nov. 21-30, 2011.
Ikeda Masaru et al., "Non-CE: Simplification of ALF coefficients merge", Joint Video Experts Team (JVET) of ITU-T SG 16 WP 3 and ISO/IEC JTC 1/SC 29/WG 11, 13th Meeting: Marrakech, MA, Jan. 9-18, 2019.
Jianle Chen et al., "Algorithm description for Versatile Video Coding and Test Model 5 (VTM 5)", Joint Video Experts Team (JVET) of ITU-T SG 16 WP3 and ISO/IEC JTC 1/SC29/WG 11, 14th Meeting: Geneva, CIL, Mar. 19-27, 2019.
Yu Li, "The Optimization of AVS Software Decoding", Shanghai Jiao Tong University, Mar. 2010.
The World Intellectual Property Organization (WIPO) International Search Report for PCT/CN2019/092868 Mar. 23, 2020 5 Pages.
Tsai C Y, Chen C Y, Yamakage T, et al. Adaptive loop filtering for video coding[J]. IEEE Journal of Selected Topics in Signal Processing. 7(6). Jul. 2013: 934-945.
M. Karczewicz, L. Zhang, W.-J. Chien, and X. Li, "Geometry transformation-based adaptive in-loop filter," in Picture Coding Symposium (PCS), 2016. IEEE, 2016, pp. 1-5.
Jonathan Taquet, et al., "CE5: Results of tests CE5-3.1 to CE53.4 on Non-Linear Adaptive Loop Filter", Joint Video Experts Team of ITU-T SG 16 WP 3 and ISO/IEC JTC 1/SC 29/wg 11, Mar. 19, 2019.
Jonathan Taquet, et al., "Non-Linear Adaptive Loop Filter", Joint Video Experts Team of ITU-T SG 16 WP 3 and ISO/IEC JTC 1/SC 29/wg 11, Jan. 8, 2019.
Sung-Chang Lim et al., "Non-CE5: Simplification on ALF clipping parameter coding", Motion Picture Expert Group or ISO/IEC JTC1/SC29/WG11, 127. MPEG Meeting, No. m48144, Jun. 18, 2019, 7 pages, Gothenburg.
Nan Hu et al., "Non-CE5: Modification of clipping value signalling for adaptive loop filter", Motion Picture Expert Group or ISO/IEC JTC1/SC29/WG11), 127. MPEG Meeting, No. m48150, Jun. 17, 2019, 9 pages, Gothenburg.
Li Zhang et al., "Non-CE5: Modified coding method for ALF clipping parameters", Motion Picture Expert Group or ISO/IEC JTC1/SC29/WG11, 127. MPEG Meeting, No. m48144, Jun. 18, 2019, 5 pages, Gothenburg.
Jonathan Taquet et al, "NCE5: Results of tests CE5-3.1, CE5-3.2, CE5-3.3 and CE5-3.4 on Non-Linear Adaptive Loop Filter", The Joint Video Exploration Team of ISO/IEC JTC1/SC29/WG11 and ITU-T SG. 16, 14. JVET Meeting, No. m48150, Mar. 12, 2019, 8 pages, Geneva.
Xuewei Meng et al., "Non-CE5: Modification of clipping value signaling for ALF", Joint Video Experts Team (JVET) of ITU-T SG 16 WP 3 and ISO/IEC JTC 1/SC 29/WG 11 15th Meeting: Gotherburg, SE, Jul. 3-12, 2019, JVET-O0430 (version 1), Jun. 26, 2019.
Xuewei Meng et al., "Non-CE5: Unification of non-linear ALF luma/chroma clipping parameter", Joint Video Experts Team (JVET) of ITU-T SG 16 WP 3 and ISO/IEC JTC 1/SC 29/WG 11 15th Meeting: Gotherburg, SE, Jul. 3-12, 2019, JVET-O0437 (version 1), Jun. 26, 2019.

* cited by examiner

LOOP FILTERING METHOD AND DEVICE

CROSS-REFERENCE TO RELATED APPLICATIONS

This application is a continuation of International Application No. PCT/CN2019/092868, filed on Jun. 25, 2019, the entire content of which is incorporated herein by reference.

TECHNICAL FIELD

The present disclosure relates to the technical field of digital video coding and, more specifically, to a method and device for loop filtering.

BACKGROUND

At present, in order to reduce the bandwidth occupied by video storage and transmission, video data needs to be encoded and compressed. Among the commonly used encoding techniques, the video encoding compression process includes block division, prediction, transformation, quantization, and entropy coding processes to form a hybrid video encoding framework. On the basis of this hybrid video coding framework, after decades of development, video codec technical standards have been established. Some of the current mainstream video codec standards include the international video coding standards H.264/MPEG-AVC, H.265/MPEG-HEVC, the domestic audio and video coding standard AVS2, and the international standard H.266/VVC and the domestic standard AVS3 currently under development.

In the encoding process of block division, prediction, transformation, quantization, and entropy coding, due to the quantization, there will be compression distortions such as block effect and ringing effect in the decoded and reconstructed video. At the same time, in the inter-frame prediction mode, the compression distortion in the reconstructed video will affect the encoding quality of subsequent images. Therefore, in order to reduce compression distortion, the loop filter technology is introduced into the codex structure framework to improve the quality of the current decoded image and provide high-quality reference images for subsequent coded images to improve compression efficiency.

In the versatile video coding (VVC) standard and part of the high efficiency video coding (HEVC) standard currently being developed, loop filters include a deblocking filer (DBF), a sample adaptive offset (SAO) filter, and an adaptive loop filter (ALF). The ALF calculates and filters adaptive filter coefficients based on different pixels in the image based on the principle of Wiener filter. Although ALF can provide good filtering effects and improve coding efficiency, it has high complexity and time-consuming calculations, and has certain defects in practical applications.

SUMMARY

An aspect of the present disclosure provides a loop filtering method. The loop filtering method includes determining a clip index parameter of a loop filter, and encoding the clip index parameter by using a non-exponential Golomb encoding method.

Another aspect of the present disclosure provides a loop filtering method. The loop filtering method includes obtaining a bitstream of a loop filter, and decoding a bitstream of a clip index parameter in the bitstream to obtain the clip index parameter of the loop filter by using a non-exponential Golomb decoding method.

Another aspect of the present disclosure provides a non-transitory computer-readable storage medium storing a bitstream obtained by a method. The method includes determining a clip index parameter of a loop filter, and encoding the clip index parameter by using a non-exponential Golomb encoding method.

DETAILED DESCRIPTION OF THE EMBODIMENTS

The technical solutions in the embodiments of the present disclosure will be described below with reference to the accompanying drawings.

The embodiments of the present disclosure can be applied to standard or non-standard image or video encoders, for example, an encoder of VVC standard.

It should be understood that the specific examples in the present disclosure are to help those skilled in the art to better understand the embodiments of the present disclosure, rather than limiting the scope of the embodiments of the present disclosure.

It should also be understood that formulas in the embodiments of the present disclosure are examples, rather than limiting the scope of the embodiments of the present disclosure. Each formula can be modified, and these modifications should also fall within the scope of the present disclosure.

It should also be understood that, in various embodiments of the present disclosure, the sequence numbers of each process or step does not indicate the order of execution. The execution order of the processes and steps should be determined by their functions and internal logics, and does not pose any limitation on implementing embodiments of the present disclosure.

It should also be understood that the various embodiments described in this specification can be implemented individually or in combination, which is not limited in the present disclosure.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Figure 1:
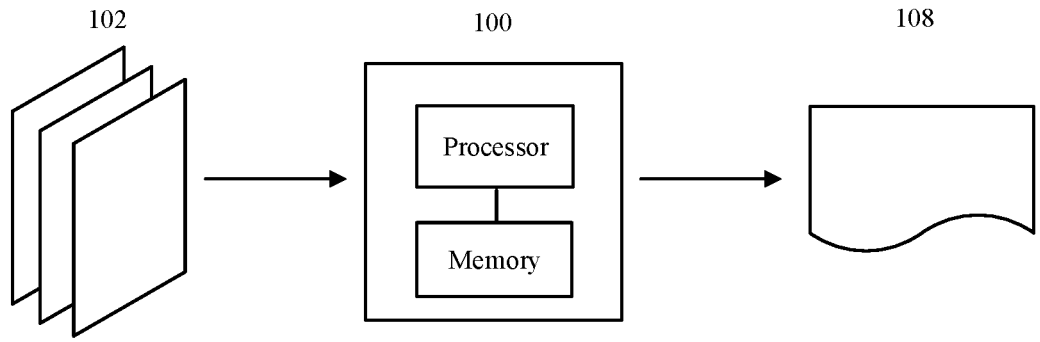
FIG. 1 is an architectural diagram of applying a technical solution of an embodiment of the present disclosure.

FIG. 1 is an architectural diagram of applying a technical solution of an embodiment of the present disclosure.

As shown in FIG. 1, a system 100 can be used to receive to-be-processed data 102, process the to-be-processed data 102, and generate processed data 108. For example, the system 100 may receive to-be-encoded data, and encode the to-be-encoded data to generated encoded data. Alternatively, the system 100 may receive to-be-decoded data, and decode the to-be-decoded data to generate decoded data. In some embodiments, the components in the system 100 may be implemented by one or more processors, which may be processors in a computing device or processors in a mobile device (e.g., an unmanned aerial vehicle). The processor may be any type of processor, which is not limited in the embodiments of the present disclosure. In some embodiments, the processors may include an encoder, a decoder, or a codec, etc. In some embodiments, the system 100 may include one or more storage devices. The storage device may be used to store computer executable instructions and data, such as the computer executable instructions that implement the technical solution provided in the embodiments of the present disclosure, the to-be-processed data 102, the processed data 108, etc. Further, the storage device may be any type of storage, which is not limited in the embodiments of the present disclosure.

The to-be-encoded data may include text, images, graphic objects, animation sequences, audio, video, or any other data that needs to be encoded. In some cases, the to-be-encoded data may include sensory data from sensors, which may be may be visual sensors (e.g., cameras, infrared sensor, etc.), microphones, near field sensors (e.g., ultrasonic sensors, radars, etc.), position sensors, temperature sensors, touch sensors, etc. In some cases, the to-be-encoded data may include information from a user, such as biometric information, which may include facial features, fingerprint scans, retinal scans, voice recordings, DNA sampling, etc.

Figure 2:
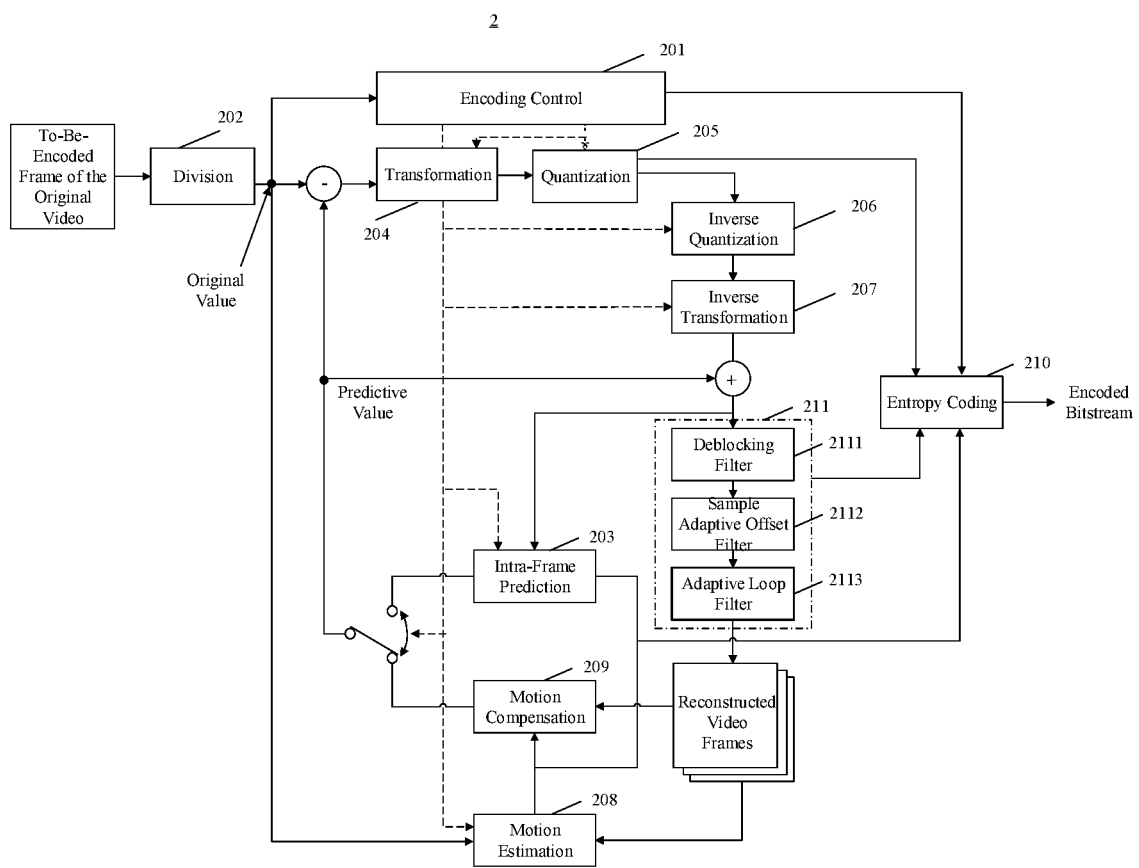
FIG. 2 is a schematic diagram of a video coding framework according to an embodiment of the present disclosure.

FIG. 2 is a schematic diagram of a video encoding framework 2 according to an embodiment of the present disclosure. As shown in FIG. 2, after receiving the to-be-encoded video, starting from the first frame of the to-be-encoded video, each frame in the to-be-encoded video is encoded in sequence. The current coding frame may mainly go through the prediction, transformation, quantization, and entropy coding processes to output the currently encoded bitstream at the end. Correspondingly, the decoding process generally decodes the received encoded bitstream based on an inverse process of the above process to recover the video frame information before decoding.

Specifically, as shown in FIG. 2, the video encoding framework 2 includes an encoding control module 201, which may be configured for decision-making control actions in the encoding process and the selection of parameters. For example, as shown in FIG. 2, the encoding control module 202 may control the parameters used in transformation, quantization, inverse quantization, and inverse transformation, control the selection of intra-frame or inter-frame modes, and control the parameters of motion estimation and filtering. In addition, the control parameters of the encoding control module 202 may also be input to the entropy coding module for encoding to form a part of the encoded bitstream.

When the encoding of the current to-be-encoded frame starts, division processing 202 may be performed on the to-be-encoded frame. More specifically, the to-be-encoded frame may be first divided into slices, and then divided into blocks. In some embodiments, the to-be-encoded frame may be divided into a plurality of non-overlapping largest coding tree units (CTUs). Each CTU may also be divided iteratively into a series of smaller coding units (CUs) in a quadtree, binary tree, or triple tree manner. In some examples, a CU may also include a prediction unit (PU) and a transformation unit (TU), where PU may be the basic unit of prediction and TU may be the basic unit of transformation and quantization. In some examples, PU and TU may be divided into one or more blocks on the basis of CU respectively, One PU may include multiple prediction blocks (PBs) and related syntax elements. In some examples, PU and TU may be the same, or they may be obtained by the CU through different division methods. In some examples, at least two of CU, PU, and TU may be the same. For example, CU, PU, and TU may not be distinguished, and all prediction, quantization, and transformation may be performed in units of CU. For ease of description, the CTU, CU, or other formed data units are all referred to as coding blocks in the following description.

It can be understood that in the embodiments of the present disclosure, the data unit for video coding may be a frame, a slice, a coding tree unit, a coding unit, a coding block, or any combination of the above. In different embodiments, the size of the data unit may vary.

More specifically, as shown in FIG. 2, after the to-be-encoded frame is divided into a plurality of coding blocks, a prediction process can be performed to remove the spatial and temporal redundant information of the current to-be-encoded frame. Currently, the commonly used predictive coding methods include the intra-frame prediction and the inter-frame prediction. Intra-frame prediction only uses the reconstructed information in the current frame to predict the current coding block, while inter-frame prediction uses information in other frames (also referred to as reference frames) that have been reconstructed before to predict the current coding block. More specifically in the embodiments of the present disclosure, the encoding control module 202 is used to decide whether to select the intra-frame prediction or the inter-frame prediction.

When the intra-frame prediction mode is selected, the process of intra-frame prediction 203 may include obtaining the reconstructed block of the neighboring blocks that have been coded around the current coding block as a reference block. Based on the pixel value of the reference block, the prediction mode method can be used to calculate a predicted value to generate a prediction block, and the corresponding pixel values of the current coding block and the prediction block can be subtracted to obtain the residual of the current coding block. The residual of the current coding block may go through transformation 204, quantization 205, and entropy coding 210 to form the bitstream of the current coding block. Further, after all coding blocks of the current to-be-encoded frame undergo the above encoding process, they form a part of the bitstream of the to-be-encoded frame. In addition, the control and reference data generated in the intra-frame prediction 203 may also be coded for entropy coding 210 to form a part of the encoded bitstream.

More specifically, the transformation 204 may be used to remove the correlation of the residual of the image block in order to improve the coding efficiency. For the transformation of the residual data of the current coding block, two-dimensional discrete cosine transform (DCT) and two-dimensional discrete sine transform (DST) are generally used. For example, at the encoding end, the residual information of the to-be-encoded block may be respectively multiplied by an NxM transformation matrix and its transposed matrix, and the transformation coefficients of the current coding block may be obtained after the multiplication.

After generating the transformation coefficients, the quantization 205 may be used to further improve the compression efficiency. The transformation coefficients can be quantized to obtain quantized coefficients, and then the quantized coefficients can be subjected to entropy coding 210 to obtain the residue bitstream of the current coding block. In some embodiments, the entropy coding method may include, but is not limited to, context adaptive binary arithmetic coding (CABAC) entropy coding.

More specifically, the coded neighboring block in the intra-frame prediction 203 process may be the neighboring block that has been coded before the current coding block is coded. After transformation 204, quantization 205, inverse quantization 206, and inverse transformation 207 are performed on the residual generated in the encoding process of the neighboring block, the residual may be added to the prediction block of the neighboring block to obtained the reconstructed block. Correspondingly, the inverse quantization 206 and inverse transformation 207 may be the inverse process of quantization 206 and transformation 204, which can be used to restore the residual data before quantization and transformation.

As shown in FIG. 2, when the inter-frame prediction mode is selected, the inter-frame prediction process may include motion estimation 208 and motion compensation 209. More specifically, the motion estimation 208 may be performed based on the reference frame image in the reconstructed video frame, and the image block most similar to the current coding block may be identified as a matching block in one or more reference frame images based on a certain matching criterion. The relative displacement between the matching block and the current coding block may be a motion vector (MV) of the current to-be encoded block. After performing motion estimation on all coding blocks in the to-be-encoded frame, motion compensation may be performed on the current to-be-encoded frame based on the motion vector and the reference frame to obtain the predicted value of the to-be-encoded frame. The original value of the pixel of the to-be-encoded fame may be subtracted from the corresponding predicted value to obtain the residual of the to-be-encoded frame. After transformation 204, quantization 205, and entropy coding 210 are performed, the residual of the current to-be-encoded frame may form a part of the encoded bitstream of the to-be-encoded frame. In addition, the control and reference data generated in motion compensation 209 may also be encoded by entropy coding 210 to form a part of the encoded bitstream.

In some embodiments, as shown in FIG. 2, the reconstructed video frame is a video frame obtained after filtering 211. Filtering 211 may be used to reduce compression distortions such as blocking effects and ringing effects generated in the encoding process, and the reconstructed video frame may be used to provide reference frames for inter-frame prediction during the encoding process. In the decoding process, the reconstructed video frame may be output as the final decoded video after post-processing. In the embodiments of the present disclosure, the filtering 211 may include three filtering techniques, such as a deblocking (DB) filter 2111, a sample adaptive offset (SAO) filter 2112, and an adaptive loop filter (ALF) 2113, where the ALF 2113 may be set after the DB 2111 and the SAO 2112. The filtering parameters in the filtering 211 process may also be transmitted to the entropy coding for encoding, forming a part of the encoded bitstream.

Figure 3:
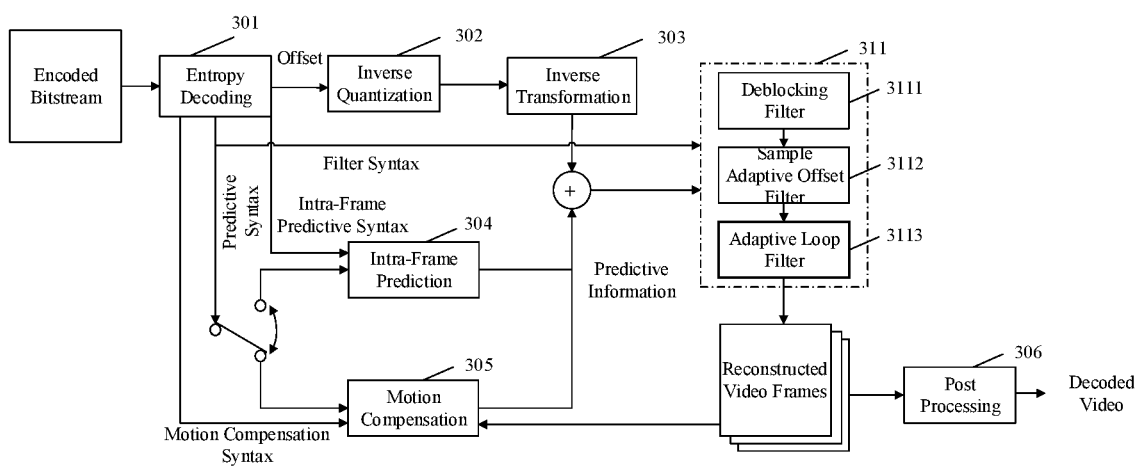
FIG. 3 is a schematic diagram of a video decoding framework according to an embodiment of the present disclosure.

FIG. 3 is a schematic diagram of a video decoding framework 3 according to an embodiment of the present disclosure. As shown in FIG. 3, the operation processes of video decoding correspond to the operation processes of video encoding. Firstly, entropy decoding 301 is performed to obtain one or more of the residual data, prediction syntax, intra-frame prediction syntax, motion compensation syntax, and filtering syntax in the encoded bitstream. In some embodiments, the residual data may undergo inverse quantization 302 and inverse transformation 303 to obtain original residual data information. In addition, whether the current decoded block uses intra-frame prediction or inter-frame prediction can be determined based on the prediction syntax. If the intra-frame prediction 304 is used, based on the decoded intra-frame prediction syntax, the reconstructed image block in the current frame may be used to contract the prediction information based on the inter-frame prediction method. Alternatively, if the inter-frame prediction is used, based on the decoded motion compensation syntax, the reference block in the reconstructed image may be determined to obtain the prediction information. Subsequently, the prediction information and the residual information can be superimposed, and the reconstructed video frame can be obtained after filtering 311, and the reconstructed video frame can be subjected to post-processing 306 to obtain the decode video.

More specifically, in the embodiments of the present disclosure, the filtering 311 may be the same as the filtering 211 in FIG. 2, including a deblocking (DB) filter 3111, an adaptive sample offset (SAO) filter 3112, and an adaptive loop filter (ALF) 3113. In some embodiments, the filtering parameters and the control parameters in filtering 311 may be obtained by performing entropy decoding on the encoded bitstream, and three types of filtering may be performed respectively based on the obtained filtering parameters and control parameters.

More specifically, DB filtering may be used to process pixels on the boundary between the PU and the TU, and the low-pass filter obtained by training may be used to perform nonlinear weighting of the boundary pixels, thereby reducing blocking effects. The SAO filtering may take the coding block in the frame image as a unit, and may be used to classify the pixel value in the coding block, and add a compensation value to each type of pixel. Different coding blocks may use different filtering forms and different types of pixel compensation, such that the reconstructed frame image can be closer to the original frame image to avoid the ringing effect. The ALF filtering is a Wiener filtering process. Based on the principle of Wiener filtering, filter coefficients can be calculated for filtering. The filter coefficients are mainly used to minimize the mean-square error (MSE) between the reconstructed frame image and the original frame image, thereby further improving the image quality of the reconstructed frame, improving the accuracy of motion estimation and motion compensation, and effectively improving the coding efficiency of the entire coding system. However, at the same time, ALF filtering has high complexity and time-consuming calculations, and there are certain defects in the actual application process.

Figure 4:
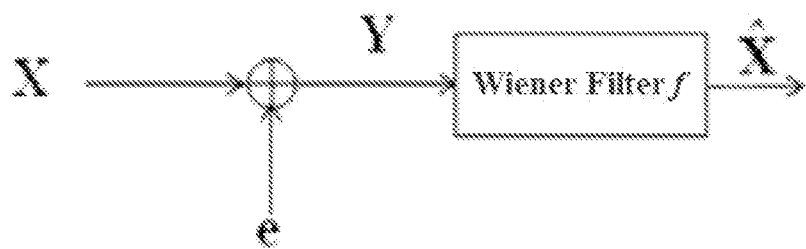
FIG. 4 is a schematic diagram of a Wiener filter according to an embodiment of the present disclosure.

For the ease of understanding, the ALF filtering process will be described in detail below in conjunction with FIG. 4, FIG. 5A, and FIG. 5B.

ALF Filter Coefficient Calculation Principle.

First, based on the Wiener filtering principle, the calculation method for calculating the ALF filter coefficients will be described. As shown in FIG. 4, a pixel signal in the currently encoded original encoded frame is X, the reconstructed pixel signal after encoding, DB filtering, and SAO filtering is Y, and the noise or distortion introduced by Y in this process is e. After the reconstructed pixel signal is filtered by the filter coefficient f in the Wiener filter, an ALF reconstructed signal g is formed, such that the mean square error between the ALF reconstructed signal and the original pixel signal can be minimal, and f is the ALF filter coefficient. More specifically, the calculation formula off may be as follows.

$$f = \underset{f}{\operatorname{argmin}} \|X - f*Y\|_2^2$$

Figure 5A:
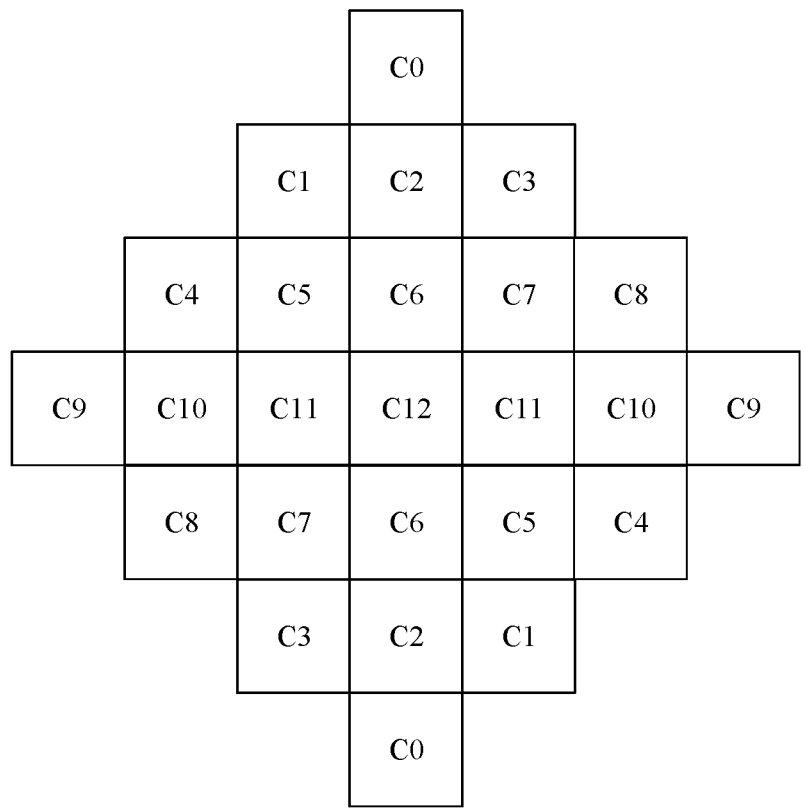
FIG. 5A is a schematic diagram of an ALF according to an embodiment of the present disclosure.
Figure 5B:
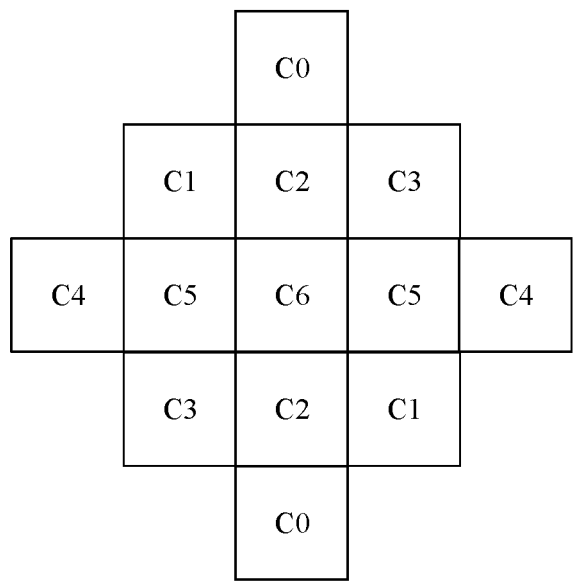
FIG. 5B is a schematic diagram of another ALF according to an embodiment of the present disclosure.

In some embodiments, a filter composed of a set of ALF filter coefficients as shown in FIG. 5A and FIG. 5B may include 13 filter coefficients distributed symmetrically from C0 to C12 with the filter length of 7, or 7 filter coefficients distributed symmetrically from C0 to C6 with the filter length of 5. In some embodiments, the filter shown in FIG. 5A can also be referred to as a 7*7 filter, which is suitable for encoding frame brightness components, and the filter shown in FIG. 5B can also be referred to as a 5*5 filter, which is suitable for encoding frame chrominance components.

It can be understood that that in the embodiments of the present disclosure, the filer composed of the ALF filter coefficients may also be a filter of other forms, for example, a filter form having a symmetrical distribution and a filter length of 9, which is not limited in the embodiments of the present disclosure.

In some embodiments, in a linear ALF filtering process, for the to-be-filtered pixels in the reconstructed image frame, the weighted average of the surrounding pixels may be used to obtain the result after the current pixel filtering, that is, the corresponding pixel in the ALF reconstructed image frame. More specifically, the pixel (x,y) in the reconstructed image frame may be the current to-be-filtered pixel, and (x,y) may be the position coordinate of the current to-be-filtered pixel in the encoding frame. The filter coefficient in the center of the filter may correspond to the pixel (x,y), and the other filter coefficients in the filter may correspond to the pixels around I(x,y) in a one-to-one relationship. The filter coefficient value in the filter may be a weighted value. The filter coefficient value in the filter may be multiplied by the corresponding pixel and then added, and the value obtained by averaging may be the filtered pixel value O(x,y) of the current to-be-filtered pixel I(x.y). The specific calculation formula may be as follows.

$$O(x, y) = \sum_{(i,j)} w(i, j) * I(x+i, y+j)$$

where w(i,j) represents any filter coefficient in the filter, (i,j) represents the relative position of the filter coefficient in the filter from the center point, and i and j are both integers less than L/2 and greater than −L/2, where L is the length of the filter. For example, as shown in FIG. 5A, the filter coefficient C12 at the center of the filter can be expressed as w(0,0), the filter coefficient C6 above C12 can be expressed as w(0,1), and the filter coefficient C11 to the right of C12 can be expressed as w(1,0).

In this way, each pixel in the reconstructed image frame can be filtered in turn to obtain the filtered ALF reconstructed image frame.

In some embodiments, the filter coefficient w(i,j) of the filter may be an integer between [−1,1).

In some embodiments, the filter coefficient w(i,j) may be enlarged by 128 times and rounded to obtain w'(i,j), where w'(i,j) may be an integer between [−128,128). More specifically, encoding and transmitting the amplified w'(i,j) is easy to implement by hardware encoding and decoding, and the amplified w'(i,j) can be used for filtering to obtain the calculation formula of O(x,y) as follows.

$$O(x, y) = \left( \sum_{i=-\frac{L}{2}}^{\frac{L}{2}} \sum_{j=-\frac{L}{2}}^{\frac{L}{2}} w'(i, j) * I(x+i, y+j) + 64 \right) \Big/ 128$$

In some embodiments, in another non-linear ALF filtering process, the filter may not be directly used as weight, and the weighted average of multiple pixels may be used to obtain the filtered result. Instead, the nonlinear parameter factor may be introduced to optimize the filtering effect. More specifically, using nonlinear ALF to filter I(x,y) to obtain the calculation formula of O(x,y) may be as follow.

$$O'(x, y) = I(x, y) + \sum_{(i,j) \neq (0,0)} w(i, j) * K(I(x+i, y+j) - I(x, y) * k(i, j))$$

where the filter coefficient w(i,j) of the filter is an integer between [−1,1), K(d,b) is a clip operation, where K(d,b)=min(b,max(−b,d)).

More specifically, in the K(d,b) clip operation, k(i,j) represents the loop filter LAF clip parameter, which may also be referred to as the clip parameter or the clip parameter hereinafter, and each filter coefficient w(i,j) may correspond to a clip parameter. For the brightness component of the encoded frame, the clip parameter may be selected one value from {1024, 181, 32, 6}. For the chrominance component of the encoded frame, the clip parameter may be selected from {1024, 161, 25, 4}, and the index corresponding to each clip parameter, that is, the clip index parameter may need to be written into the encoded bitstream. If the clip parameter is 1024, the clip index parameter 0 may need to be written into the encoded bitstream. Similarly, if the clip parameter is 181, the clip index parameter 1 may need to be written into the encoded bitstream. Therefore, it can be seen that the clip index parameter of the encoded frame brightness classification and the encoded frame chroma classification may both be integers between 0 and 3.

Pixel Categorization and Division.

Secondly, if a set of corresponding ALF filter coefficients are calculated for a pixel, the calculation is complicated and time-consuming. Further, if the ALF coefficient of each pixel is written into the encoded bitstream, the data overhead will be enormous. Therefore, it is necessary to categorize and divide the pixels in the reconstructed image, and each type of pixels can use the same set of ALF filter coefficients (a type of filter), which can reduce computational complexity and improve coding efficiency.

In some embodiments, there may be many ways to categorize pixels. For example, only the brightness Y component of the pixel may be categorized, and the chrominance UV component may not be categorized. In another example, the brightness Y component may be divided into 25 categories, and the chrominance UV component may not be divided, and there may only be one category. In other words, for a frame of image, the encoding frame of the brightness Y component may correspond to 25 sets of filters at most, and the encoding frame of the chrominance UV component may correspond to a set of filters.

It can be understood that in the embodiments of the present disclosure, the pixel category may be a category corresponding to the brightness Y component, but the embodiments of the present disclosure are not limited thereto. The pixel category may also be a category corresponding to other components or all components. For the ease of description, the following takes the categorization and division and ALF filtering of the encoded frame of the brightness Y component as an example for description.

In some embodiments, the reconstructed image frame after DB filtering and SAO filtering may be divided into a plurality of 4*4 pixel blocks, and the plurality of 4*4 pixel blocks may be categorized.

For example, each 4*4 block may be categorized based on the Laplace direction:

$$C = 5D + \hat{A}$$

where C represents the category to which the pixel block belongs, D is the Laplace direction, and $\hat{A}$ is the sub-categorization result after the direction D is categorized. There may be many ways to obtain $\hat{A}$, but $\hat{A}$ only represents the result of the sub-categorization herein.

The direction D may be calculated as follows. First, the Laplacian gradient of the current 4*4 block in different directions can be calculated. The calculation formulas are as follow.

$$g_v = \sum_{k=i-2}^{i+3} \sum_{l=j-2}^{j+3} V_{k,l},$$

$$V_{k,l} = |2R(k, l) - R(k, l-1) - R(k, l+1)|,$$

$$g_h = \sum_{k=i-2}^{i+3} \sum_{l=j-2}^{j+3} H_{k,l},$$

$$H_{k,l} = |2R(k, l) - R(k-1, l) - R(k+1, l)|,$$

$$g_{d1} = \sum_{k=i-2}^{i+3} \sum_{l=j-3}^{j+3} D1_{k,l},$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l},$$

$$D2_{k,l} = |2R(k, l) - R(k-1, l+1) - R(k+1, l-1)|$$

where i and j are the coordinates of the upper left pixel of the current 4*4 block.

R(k,l) represents the reconstructed pixel value at the (k,l) position in the 4*4 block, $V_{k,l}$ represents the Laplacian gradient of the pixel at the (k,l) coordinate in the 4*4 block in the vertical direction, $H_{k,l}$ s represents the Laplacian gradient of the pixel at the (k,l) coordinate in the 4*4 block in the horizontal direction, $D1_{k,l}$ represents the Laplacian gradient of the pixel at the (k,l) coordinate in the 4*4 block in the direction of 135°, and $D2_{k,l}$ represents the Laplacian gradient of the pixel at the (k,l) coordinate in the 4*4 block in the direction of 45°.

Correspondingly, the calculated $g_v$ represents the Laplacian gradient of the current 4*4 block in the vertical direction, $g_h$ represents the Laplacian gradient of the current 4*4 block in the horizontal direction, $g_{d1}$ represents the Laplacian gradient of the current 4*4 block in the direction of 135°, and $g_{d2}$ represents the Laplacian gradient of the current *4 block in the direction of 45°.

Subsequently, based on the extreme ratio of the Laplace gradient in the four directions, the direction D can be determined. The specific calculation formulas are as follow.

$$g_{h,v}^{max} = \max(g_h, g_v),$$

$$g_{h,v}^{min} = \min(g_h, g_v)$$

$$g_{d1,d2}^{max} = \max(g_{d1}, g_{d2}),$$

$$g_{d1,d2}^{min} = \min(g_{d1}, g_{d2})$$

$$R_{h,v} = g_{h,v}^{max} / g_{h,v}^{min}$$

$$R_{d0,d1} = g_{d1,d2}^{max} / g_{d1,d2}^{min}$$

where $g_{h,v}^{max}$ represents the maximum value of the Laplacian gradient in the horizontal and the vertical directions, $g_{h,v}^{min}$ represents the minimum value of the Laplacian gradient in the horizontal and vertical direction, $g_{d1,d2}^{max}$ represents the maximum value of the Laplacian gradient in the 45° and 135° directions, $g_{d1,d2}^{min}$ represents the minimum value of the Laplacian gradient in the 45° and 135° directions, and $R_{d0,d1}$ represents the ratio of the Laplacian gradient in the 45° and 135° directions.

If $g_{h,v}^{max} \leq t_1 \cdot g_{h,v}^{min}$ and $g_{d0,d1}^{max} \leq t_1 \cdot g_{d0,d1}^{min}$, then D may be set to 0.

If $g_{h,v}^{max} / g_{h,v}^{min} > g_{d0,d1}^{max} / g_{d0,d1}^{min}$ and $g_{h,v}^{max} \leq t_2 \cdot g_{h,v}^{min}$, -continued then D may be set to 1.

If $g_{h,v}^{max}/g_{h,v}^{min} > g_{d0,d1}^{max}/g_{d0,d1}^{min}$ and $g_{h,v}^{max} > t_2 \cdot g_{h,v}^{min}$, then D may be set to 2.

If $g_{h,v}^{max}/g_{h,v}^{min} \leq g_{d0,d1}^{max}/g_{d0,d1}^{min}$ and $g_{d0,d1}^{max} \leq t_2 \cdot g_{d0,d1}^{min}$, then D may be set to 3.

If $g_{h,v}^{max}/g_{h,v}^{min} \leq g_{d0,d1}^{max}/g_{d0,d1}^{min}$ and $g_{d0,d1}^{max} > t_2 \cdot g_{d0,d1}^{min}$, then D may be set to 4.

where t1 and t2 represent the preset thresholds,

In some embodiments, the calculation method of A may be as follows.

$A = \Sigma_{k=i-2}^{i+3} \Sigma_{l=j-2}^{j+3}(V_{k,l} + H_{k,l})$, and A may be quantified to get an integer between 0 and 4 to obtain A.

Therefore, combining the values of D and A, the value range of C may be an integer between 0-24. In the embodiments of the present disclosure, the 4*4 blocks in one frame of image may be divided into 25 categories at most.

In some embodiments, there may be N types of 4*4 blocks in the encoded frame, and each type of 4*4 block may have a set of ALF filter coefficients, where N may be an integer between 1-25.

It should be understood that in the embodiments of the present disclosure, in addition to dividing the entire image frame into a plurality of 4*4 blocks, the entire image frame may also be divided into blocks of other pixel sizes, such as dividing into a plurality of 8*8 or 16*16 blocks, which are not limited in the embodiments of the present disclosure.

It should also be understood that in the embodiments of the present disclosure, in addition to the foregoing categorization based on the Laplace direction, other categorization methods may also be used to categorize the blocks, which are not limited in the embodiments of the present disclosure.

It should also be understood that in the embodiments of the present disclosure, in addition to 25 categories, a frame of image may also be categorized into any number of categories, which is not limited in the embodiments of the present disclosure.

Block-Based ALF Filtering.

ALF filtering can be divided into frame-based ALF, block-based ALF, and quadtree-based ALF. The frame-based ALF uses a set of filter coefficients to filter the entire frame. The block-based ALF divided the encoded frame into image blocks of equal sizes, and determines whether to perform ALF filtering on the image blocks. The quadtree-based ALF is based on the quadtree division method that divides the encoded frame into image blocks of different sizes, and determines whether to perform ALF filtering. In some cases, the frame-based ALF calculation is simple, but the filtering effect is not optimal, while the quadtree-based ALF calculation is more complicated. Therefore, in some standards or technologies, such as the latest VVC standard current being developed, the reference software VTM uses block-based ALF.

Take the block-based ALF in VTM as an example. In VTM, an encoded frame has a frame-level ALF filter flag bit and a block-level ALF filter flag bit. In some embodiments, the block-level may be CUT, CU, or image blocks divided by other division methods, which is not limited in the embodiments of the present disclosure. For the ease of description, the following uses the CTU-level ALF filter flag bit as an example.

More specifically, when the frame-level ALF filter flag bit indicates that ALF filtering is not being performed, the CTU-level ALF filter flag bit in the encoded frame may not be marked. When the frame-level ALF filter flag bit indicates that ALF filtering is being performed, the CTU-level filter flag bit in the encoded frame may be marked to indicate whether the current CTU performs the ALF filtering.

In some embodiments, the encoded frame may include Z CTUs, and the method for calculating N groups of ALF filter coefficients in the encoded frame may include combining whether the Z CTUs in the encoded frame are subjected to ALF filtering, and for each combination, calculating N groups of ALF filter coefficients and the rate-distortion costs (RD Costs) in this method. In some embodiments, the calculation method of the i-th group of ALF in each group of ALF filter coefficients may include, in the current CTU combination, performing f calculation on the i-th type pixels in the CTU undergoing ALF filtering, and not performing f calculation on the i-th type pixels in other CTUs not undergoing ALF filtering, and calculating the i-th group of ALF filter coefficients in the current combination. It should be understood that in different combinations, the N groups of ALF filter coefficients obtained by calculation may be different from each other.

The RD Cost under multiple combinations can be compared. In some embodiments, the combination with the minimum RD Cost may be determined as the final combination, and the N groups of ALF filter coefficients calculated in this combination may be the ALF filter coefficients with the best adaptability.

When the minimum combination of RD Cost is that at least one of the Z CTUs performs ALF filtering, the frame-level ALF flag bit of the encoded frame may be marked as performing ALF filtering, and the CTU-level ALF flag bit in turn may indicate whether to perform ALF filtering in the CTU data. For example, when the flag bit is marked as 0, it may indicate that ALF filtering is not being performed, and when the flag bit is marked as 1, it may indicate that ALF filtering is being performed.

In particular, when the minimum combination of RD Cost is that Z CTUs do not perform ALF filtering, at this time, the encoded frame may not be subjected to ALF filtering, and the frame-level ALF flag bit of the encoded frame may be marked as not performing ALF filtering. At this time, the ALF flag bit of the CTU level may not be marked.

It should be understood that the ALF in the embodiments of the present disclosure is not only applicable to the VVC standard, but also applicable to other block-based ALF technical solutions or standards.

ALF Filter Coefficient Encoding Decision.

In some embodiments, after calculating the N groups of ALF filter coefficients in the current CTU combination, the ALF may be configured to decide whether to use coefficient merging techniques based on the RD Cost without affecting the quality of the reconstructed image frame. Encoding based on the above technique can further improve compression performance and reduce the number of bits required for filter coefficients.

In some embodiments, the following three decisions may be made for the N groups of ALF filter coefficients.

(1) Whether different ALF filter coefficients are combined;

(2) Whether the ALF filter coefficients are set to zero; and (3) Whether differential encoding or non-differential encoding is used to encode the ALF filter coefficients.

More specifically, the combination of different ALF filter coefficients may indicate that different types of image blocks in the reconstructed frame use the same ALF filter coefficient. If certain types of image blocks use the same filter coefficient, then less filter coefficient values can be transmitted in the bitstream, thereby improving the coding efficiency.

When the ALF filter coefficients are set to zero, there may be some types of pixels in the reconstructed frame, which is better if the ALF filter is not used. That is, the RD Cost without ALF filtering may be less than the RD Cost with ALF filtering. In this case, the filter coefficients corresponding to this type of pixels may be directly set to zero, or less filter coefficient values may be transmitted in the bitstream, thereby improving the coding efficiency.

ALF filter coefficients can choose two encoding methods. The first method is the non-differential encoding method, which includes directly writing the filter coefficients into the bitstream. The other method is the differential encoding method, which includes writing a first set of filter coefficients into the bitstream, writing a second set of coefficients after subtracting the first set of coefficients into the bitstream, and writing a third set of coefficients after subtracting the second set of coefficients into the bitstream, and so on.

In some embodiments, the decisions of whether to combine the ALF filter coefficients, whether to set the filter coefficients to zero, and the encoding method may be made sequentially. The embodiments of the present disclosure do not limit the order of the three decisions.

In some embodiments, whether the decision of combining the filter coefficients may be made first, and then the decision of whether to set the filter coefficients to zero and the decision of the encoding method may be made.

More specifically, in each decision, the RD Cost of the encoded frame may be calculated based on the current conditions, and the condition corresponding to the minimum RD Cost may be determined to obtain the result of the decision.

For example, first, when decision whether to combine the ALF filter coefficients, different types of pixels may be combined, and the combined filter coefficients may be calculated based on the Wiener filtering principle for the combined types of pixels. For example, there may be N types of pixels in the encoded frame corresponding to N groups of initial filter coefficients, and N may be a positive integer less than or equal to 25. Two or more of the N groups of pixel types can be combined, and a new filter coefficient can be obtained after the combination. For example, two group types can be combined into one type to obtain N−1 groups of types, and the filter coefficients of this type can be calculated to obtain N−1 filters.

In some embodiments, different combination methods may be used to combine the N groups of initial filter coefficients to obtain N different combined combinations after processing. The i-th combined combination may include i combined filter coefficients corresponding to at least one set of initial filter coefficients, and i may be a positive integer less than or equal to N.

In some embodiments, a new combined filter coefficient calculation may be performed for each combined combination, and in each combined combination, the encoding method and whether the combined filter coefficient in the combination is set to zero may be determined.

More specifically, different selection methods may be used to select one or more sets of combined filter coefficients from multiple combined filter coefficients and set the one or more sets of combined filter coefficients to zero, or the combined filter coefficients may not be set to zero to obtain different types of filter coefficient combinations that are set to zero. The RD Cost for different combinations of filter coefficients set to zero can be calculated. Subsequently, the specific filter coefficient combination that is set to zero with the minimum RD cost and multiple sets of zero-setting and non-zero-setting filter coefficients under this combination can be calculated.

More specifically, when a first flag bit is used to identify whether the filter coefficients are set to zero, if there is case of zero-setting, each group of filter coefficients may use a second flag bit to identify whether the set of filter coefficients are set to zero. When a set of filter coefficients is set to zero, ALF filtering may not be performed on the pixel type corresponding to the set of filter coefficients, the flag bit may indicate that the set of filter coefficients is set to zero, and the set of filter coefficients may no longer be written into the bitstream. When a set of filter coefficients is not set to zero, ALF filtering may be performed on the pixel type corresponding to the set of filter coefficients, and the flag bit may indicate that the set of filter coefficients is not set to zero. If the first flag bit indicates there is no zero-setting of the coefficients, the second flag bit may not be transmitted.

Finally, based on the calculation of RD Cost, the decision of differential encoding and non-differential encoding can be made on multiple sets of filter coefficients not set to zero, and the encoding method under the minimum RD Cost can be obtained. For example, in the differential encoding method, if the calculated RD Cost is small, then the differential encoding method can be selected.

In one combined combination, the non-zero filter coefficient and the differential/non-differential encoding method under the combined combination can be obtained through the calculation of the minimum RD Cost. Based on this, the RD Costs of multiple combined combinations can be compared to obtain the specific combined combination of the minimum RD Cost and multiple sets of filter coefficients, clip parameters, and other related filter parameters under this combination.

After determining the combination method of multiple sets of filter coefficients, whether to set the filter coefficients to zero, and the encoding method, in the encoding process, the filter coefficients corresponding to the various pixel types, which sets of filter coefficients are set to zero, and whether the differential or non-differential encoding method is used may need to be identified in the syntax flag bit. In the decoding process, the corresponding information can be obtained by decoding the syntax flag bit to perform the corresponding decoding operation.

The differential encoding method is introduced in conventional technology to reduce the number of bits required for filter coefficient encoding and improve compression performance when encoding multiple sets of filter coefficients. In particular, when there are regular changes among multiple sets of ALF filter coefficients, for example, when the difference between two sets of adjacent filter coefficients is smaller than one of the sets of filter coefficients, the number of bits required for encoding can be reduced. Otherwise, when the difference between the two sets of filter coefficients is greater than one of the sets of filter coefficients, or when the values of the two sets of filter coefficients are not regular, the number of coding bits cannot be reduced by using the differential encoding method. In this case, the non-differential encoding method can be used to directly encode the filter coefficients.

In conventional AFL technology, there is no strong regular numerical change between multiple sets of filter coefficients, and the value of the filter coefficient can be a negative number of an integer, that is, the difference between two set of filter coefficients may be partly or completely greater than any set of filter coefficients. Therefore, when choosing between differential encoding and non-differential encoding, the probability of choosing differential encoding is very low. In addition, if the differential encoding method is used for encoding, the filter coefficients will be dependent on each other. In the decoding process, once an error occurs in one of the coefficients during transmission, errors will occur in all coefficients that depend on this coefficient, resulting in a reduction in the quality of the filtered image.

At the same time, it is necessary to determine whether to use differential encoding or non-differential encoding through the calculation of the RD Cost. Further, in the decision process of whether to combine the filter coefficients and whether to set the filter coefficients to zero, many combination types are involved. Each combination type needs to use the calculation of the RD Cost to determine whether the encoding method is the differential encoding method or the non-differential encoding method. Therefore, the amount of calculation of the RD Cost is relatively large, which affects the decision calculation time of the encoding end.

More importantly, if the encoding method needs to be selected between differential encoding and non-differential encoding, the syntax flag bit needs to be used to transmit the encoding method information during the encoding process, which increases the number of bits in the bitstream, which is not beneficial for compression.

Therefore, the conventional ALF filter coefficient encoding method has redundancy and high complexity, which affects the compression efficiency and run time. In view of the above, the embodiments of the present disclosure provide an improved technical solution.

The technical solutions of the embodiments of the present disclosure can be applied to both the encoding end and the decoding end. The following describes the technical solutions of the embodiments of the present disclosure from the encoding end and the decoding end respectively.

Figure 6:
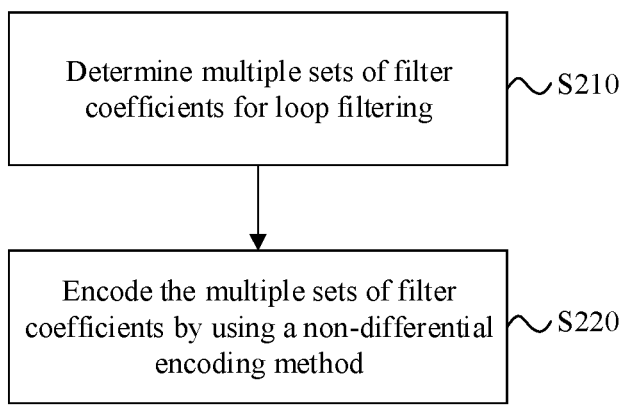
FIG. 6 is a schematic flowchart of a loop filtering method according to an embodiment of the present disclosure.

FIG. 6 is a schematic flowchart of a loop filtering method 200 according to an embodiment of the present disclosure. The method 200 may be executed by an encoding end. For example, the method 200 can be executed by the system 100 shown in FIG. 1 when performing an encoding operation.

S210, determining multiple sets of filter coefficients for loop filtering.

In some embodiments, as described above, the multiple sets of filter coefficients of the loop filter ALFs may be the coefficient values in the Wiener filter that minimize the mean square error between the reconstructed image frame and the original encoded image frame obtained based on the Wiener filtering principle.

In some embodiments, the filter may have a variety of shapes. For example, in the VVC standard, a filter including thirteen filter coefficients as shown in FIG. 5A may be used for the brightness component of an encoded frame, where the thirteen filter coefficients may constitute a set of filter coefficients. For the chrominance component of the encoded frame, a filter including seven filter coefficients as shown in FIG. 5B may be used, where the seven filter coefficients may constitute a set of filter coefficients.

In some embodiments, in the process of loop filtering ALF, the pixels in the encoded frame may be categorized. Different types of ALF filter coefficients may be different, and one type of pixel may correspond to a set of ALF filter coefficients for filtering calculation. For example, in the VVC standard, the pixels in the encoded frame may be divided into 25 categories at most, and N groups of loop filtering ALF coefficient may be obtained, where N may be an integer less than or equal to 25.

In some embodiments, a block-based loop filtering method may be used to calculate the filter coefficients. As described above, by controlling the block-level loop filter switch, one or more sets of filter coefficients can be calculated when different blocks are turned on. For example, in the VVC standard, with the CTU level as the block-level control unit, N groups of filter coefficients may be calculated.

It should be understood that in the embodiments of the present disclosure, the multiple sets of filter coefficients of the loop filter ALF may be the filter coefficients of the brightness component of the encoded frame, or the filter coefficients may be the filter coefficients of the chrominance component of the encoded frame, which is not limited in the embodiments of the present disclosure.

It should also be understood that in the embodiments of the present disclosure, the multiple sets of filter coefficients of the loop filter may be loop filter coefficients calculated based on frames, loop filter coefficients calculated based on blocks, or loop filter coefficients calculated based on quadtrees, which is not limited in the embodiments of the present disclosure.

S220, encoding the multiple sets of filter coefficients by using the non-differential encoding method.

As described above, when encoding multiple sets of filter coefficients, it is possible to encode multiple sets of filter coefficients using the differential encoding method to reduce the number of bits occupied during encoding, but the differential encoding method may not be able to reduce the number of bits in all cases. Further, in actual situation, the use of the differential encoding method is a low probability event. In addition, in some cases, such as when the difference obtained after subtracting the two sets of filter coefficients is greater than any previous set of filter coefficients, and the use of differential encoding may further increase the number of bits. Therefore, in the embodiments of the present disclosure, the non-differential encoding method can be used directly to encode the multiple sets of filter coefficients, which can improve the coding efficiency.

In some embodiments, by using the non-differential encoding method for encoding, there will be no dependency between multiple sets of filter coefficients, which can prevent errors in the transmission of multiple sets of filter coefficients and affect the decoded image quality of the decoding end.

In some embodiments, the non-differential encoding method may include the exponential Golomb encoding method, the fixed-length code encoding method, the unary code coding method, and so on.

Preferably, in the embodiments of the present disclosure, multiple sets of filter coefficients may be encoded by using the exponential Golomb encoding method and then written into the bitstream, which can realize the lossless compression of multiple sets of ALF filter coefficients.

Figure 7:
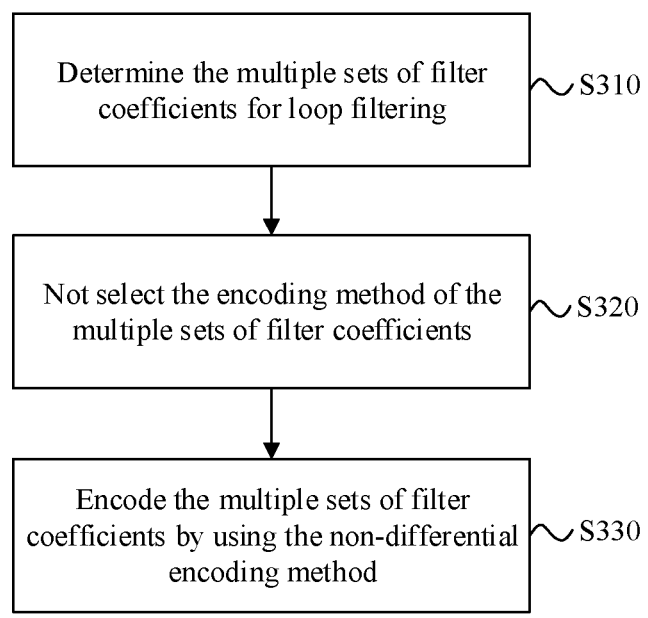
FIG. 7 is a schematic flowchart of the loop filtering method according to another embodiment of the present disclosure.

FIG. 7 is a schematic flowchart of a looping filtering method 500 at an encoding end according to an embodiment of the present disclosure.

The loop filtering method 300 includes the following processes.

S310, determining the multiple sets of filter coefficients of the loop filter.

S320, no selecting the encoding method of the multiple sets of filter coefficients.

S330, encoding the multiple sets of filter coefficients by using the non-differential encoding method.

In the embodiments of the present disclosure, the processes at S310 and S330 may be the same as the processes at S210 and S220 in FIG. 6. After multiple sets of filter coefficients are determined, the encoding method of the multiple sets of filter coefficients may not be selected, and the multiple sets of filter coefficients may be directly encoded and written into the bitstream using the non-differential encoding method.

By not selecting the encoding method of multiple sets of filter coefficients, that is, at the encoding end, the best encoding method is not selected from multiple encoding methods through decision-making calculations. In other words, the decision-making calculation process can be avoided, the calculation resources and coding time can be saved, and the coding speed can be accelerated without affecting the coding efficiency.

For example, the encoding method of multiple sets of filter coefficients may be selected by calculating the RD Cost of the encoded frames under multiple encoding methods, and the encoding method with the minimum RD Cost can be selected as the best encoding method. However, the embodiments of the present disclosure do not consider the above-mentioned RD Cost calculation and selection.

It should be understood that the selection of encoding methods for the multiple sets of filter coefficients may include, but is not limited to, the selection between the differential encoding method and the non-differential encoding method, and may also include the selection of a variety of encoding methods such as the exponential Golomb encoding method, which is not limited in the embodiments of the present disclosure.

In some embodiments, in the loop filtering method 200 and the loop filtering method 300, the syntax elements of the loop filtering may not include the syntax elements indicating the encoding method of multiple sets of filter coefficients.

If the encoding method needs to be selected from multiple encoding methods, in the encoded syntax element, at least one bit may be reserved to identify the encoding method of the filter coefficients, and the syntax element identifying the encoding method of the filter coefficients may be encoded and written into the bitstream.

In some embodiments, the syntax element of the loop filter may not include a syntax element indicating the encoding method of the multiple sets of filter coefficients is the differential encoding method or the non-differential encoding method.

For example, in the VVC standard, the "alf_luma_coeff_delta_prediction_flag" syntax flag bit may be used to identify whether the encoding method of the loop filter ALF filter coefficients in the brightness component encoding frame is differential encoding or non-differential encoding. More specifically, the syntax flag bit may be an unsigned integer, which occupies one bit. When the alf_luma_coeff_delta_prediction_flag=0, the ALF filter coefficients may be encoded using the non-differential encoding method. When the alf_luma_coeff_delta_prediction_flag=1, the ALF filter coefficients may be encoded using the differential encoding method.

However, in the embodiments of the present disclosure, there is no need to select an encoding method between multiple encoding methods. Therefore, the syntax element of the loop filter does not indicate the encoding method of the multiple sets of filter coefficients. For example, in the VVC standard, the syntax element of "alf_luma_coeff_delta_prediction_flag" can be deleted to reduce one bit of coding to improve the coding compression efficiency.

It should be understood that the syntax element of the loop filter in the embodiments of the present disclosure may be the syntax element of encoding the brightness component of the encoding frame, which does not indicate the encoding method of the multiple sets of filter coefficients of the brightness component, or the syntax element of the chrominance component of the encoding frame, which does not indicate the encoding method of the multiple sets of filter coefficients of the chrominance component, which is not limited in the embodiments of the present disclosure.

It should also be understood that the embodiments of the present disclosure can also be applied to other coding standards or coding technical solutions that use loop filter ALF other than VVC, and the flag bit used to identify the filter coefficient encoding method of the loop filter ALF may be deleted in the syntax element.

Figure 8:
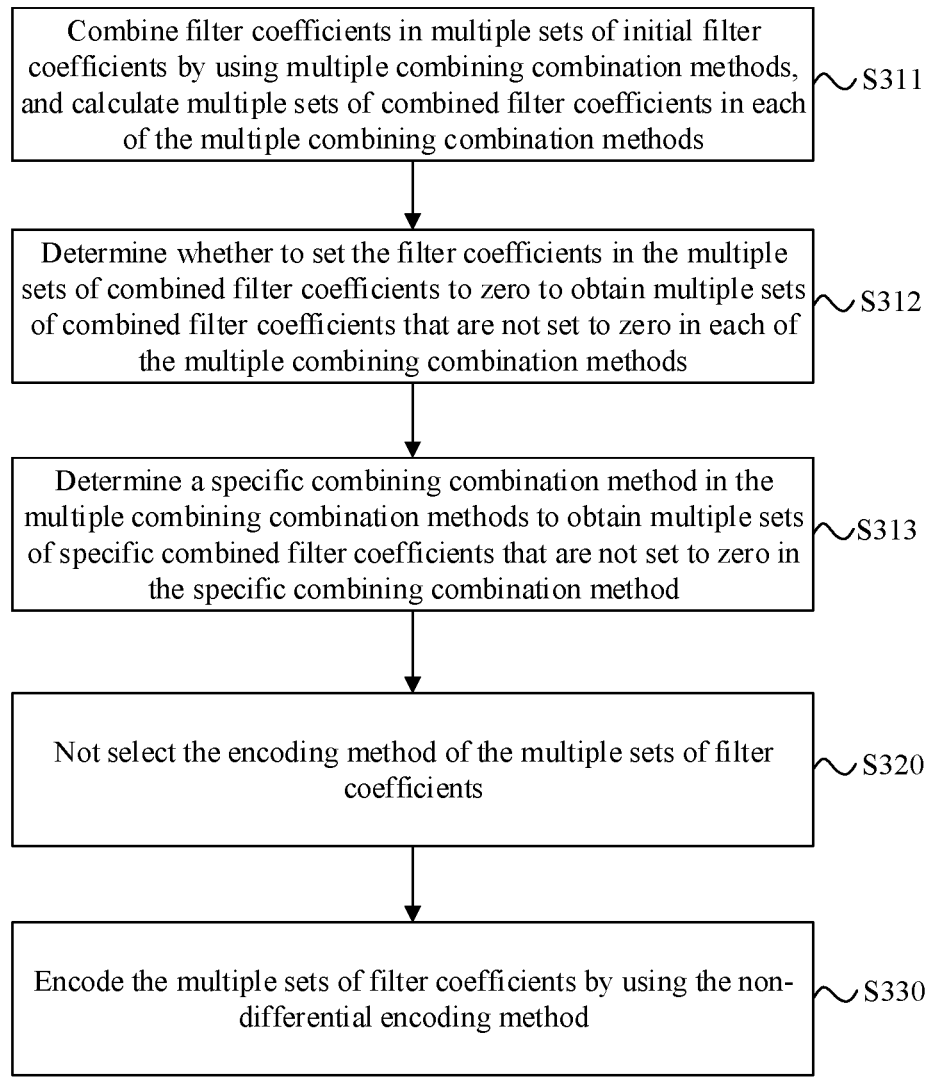
FIG. 8 is a schematic flowchart of the loop filtering method according to another embodiment of the present disclosure.

In some embodiments, in the loop filtering method 200 and the loop filtering method 300, determining the multiple sets of filter coefficients for the loop filtering in the process at S210 and the process at S310 may include performing combining determination on multiple sets of initial filter coefficients and performing zero-setting determination to obtain the multiple sets of filter coefficients. More specifically, as shown in FIG. 8, the loop filtering method 300 is taken as an example for description.

S311, combining the filter coefficients in the multiple sets of initial filter coefficients by using multiple combining combination methods, and calculating the multiple combined combination filter coefficients in each of the multiple combining combination methods.

In the embodiments of the present disclosure, the set of initial filter coefficients may be multiple sets of initial filter coefficients corresponding to the pixel type calculated based on the Wiener filtering principle and the pixel type. The initial filter coefficients may be multiple sets of initial filter coefficients calculated based on CTU blocks, or multiple sets of initial filter coefficients calculated based on frames or quadtrees. For details of this process, reference can be made to the ALF filtering process described above, which will not be repeated here.

For example, if there are N sets of calculated pixel types, the corresponding initial filter coefficients may be N sets. That is, the i-th set of initial filter coefficients in the N sets of initial filter coefficients may be used to filter the i-th type of N types of pixels, where i may be a positive integer less than or equal to N. In some embodiments, in a possible implementation, N may be a positive integer not greater than 25.

At least two sets of the N sets of initial filter coefficients may be combined into one set, and the pixels corresponding to the at least two sets of initial filter coefficients may be filtered using the combined filter coefficients after combination. In some embodiments, the combined at least two sets of initial filter coefficients may be adjacent filter coefficients. For example, in a possible combination, the 1-3 sets of the 25 sets of initial filter coefficients may be combined, the 4-8 groups may be combined, the 9-15 sets may be combined, and the 16-25 sets may be combined.

In some embodiments, different combinations and preliminary determinations may be made on the N sets of filter coefficients to obtain a total of V combinations of combinations. Based on the Wiener filtering principle, the filter coefficients of multiple combinations under V combinations can be recalculated. In some embodiments, the combined filter coefficients in the V combined combinations may include $K_1$~$K_V$ sets. $K_1$~$K_V$ may all be positive integers less than or equal to N, and each combined filter coefficient in the $K_1$~$K_V$ set may correspond to one or more pixels. In particular, when there is no combination of filter coefficients in the N sets of filter coefficients, the combined filter coefficients may be the same as the initial filter coefficients, and one set of filter coefficients may correspond to a type of pixel.

S312, determining whether to set the filter coefficients in the multiple sets of combined filter coefficient to zero to obtain the multiple sets of combined filter coefficients that are not set to zero in each of the multiple combining combination methods.

More specifically, when a set of filter coefficients is set to zero, the set of filter coefficients may not be used to filter the pixels, and the pixel values remain unchanged. More specifically, the syntax element flag bit may be used to identify whether there is a filter coefficient set that is set to zero in multiple sets of filter coefficients. Further, when there is a filter coefficient set that is set to zero in multiple sets of filter coefficients, other flag bits may also be used to identify whether each set of filter coefficients in the multiple sets of filter coefficients is set to zero.

More specifically, in multiple sets of combined filter coefficients in a combining combination method, the multiple sets of combined filter coefficients are not set to zero, and one or more sets of combined filter coefficients in the multiple sets of combined filter coefficients may be set to zero to obtain multiple zero-setting combinations.

In some embodiments, based on the rate distortion optimization (RDO) technology, whether to set the filter coefficient in the multiple sets of combined filter coefficients to zero may be determined. That is, the RD cost can be calculated for the encoded frames under the multiple zero-setting combinations, and the zero-setting combination with the minimum RD cost may be the final zero-setting combination method. For example, in a possible implementation, the current combination method may have 10 sets of combined filter coefficients. Based on the RD cost calculation, the 1-3 and 5-7 sets of the 10 sets of combined filter coefficients may be determined under the minimum RD cost and set to zero, and the other sets may not be set to zero.

More specifically, the RD cost calculation method may be as follows.

$$RD\ cost = D + A * R$$

where D (distortion) represents the distortion between the reconstructed image frame and the original image encoded frame under the current technology, generally represented by sum of square errors (SSE), sum of absolute difference (SAD), or sum of absolute transformed difference (SATD) after Hadamard transformation; and R (rate) represents the number of bits required for encoding under the current technology. R may be expressed as the degree of data compression. The lower the R, the higher the degree of data compression and the greater the distortion; the larger the R, the smaller the distortion, but more storage space is required, which will also increase the pressure of network transmission. Therefore, it is necessary to find a balance between R and D to optimize the compression effect. Therefore, the Lagrangian method can be used to measure the proportion of R and D in the RD cost. The Lagrangian multiplier A can be multiplied to R to weigh the weight of the number of bits in the RD cost, which represents the coding distortion that will be generated by reducing one bit rate.

After the zero-setting determination, the set of filter coefficients set to zero may not be encoded. Therefore, the number of bits of the filter coefficient coding can be reduced, and the coding compression efficiency can be improved.

S313, determining a specific combining combination method from the multiple combining combination methods, and obtaining multiple sets of specific combined filter coefficients that are not set to zero in the specific combining combination method.

From the above description, it can be seen that in each combining combination method, an optimal zero-setting combination method and its RD cost value can be obtained through RD cost calculation. By comparing the RD cost values of the optimal zero-setting combinations of the V combinations, the combining combination method corresponding to the minimum RD cost can be determined as the optimal specific combining combination method, and multiple sets of specific combined filter coefficients that are not set to zero under the specific combining combination method can be obtained.

In the combining combination method, the number of sets of combined filter coefficients may be smaller than the number of sets of initial filter coefficients, and the number of encoded bits of the filter coefficients may be greatly reduced, which further improves the coding compression efficiency.

In the embodiments of the present disclosure, the multiple sets of specific combined filter coefficients may be multiple sets of filter coefficients in the loop filtering method 400 and the loop filtering method 500. In some embodiments, the encoding method of the multiple sets of specific combined filter coefficients may not be selected, and the multiple sets of specific combined filter coefficients may be directly encoded using the non-differential encoding method.

In some embodiments, the pixel type corresponding to each set of filter coefficients in the multiple sets of specific combined filter coefficients may be identified.

For example, after calculating the RD cost, seven sets of combined filter coefficients may be determined, and the first to fifth types of pixels may correspond to the first set of combined filter coefficients, the sixth to ninth types of pixels may correspond to the second set of filter coefficients, the tenth types of pixels may correspond to the third set of filter coefficients, the eleventh to fourteenth types of pixels may correspond to the fourth set of filter coefficients, the fifteenth to twenty-first types of pixels may correspond to the fifth set of filter coefficients, the twenty-second to twenty-third types of pixels may correspond to the sixth set of filter coefficients, and the twenty-fourth to twenty-fifth types of pixels may correspond to the seventh set of filter coefficients. In the encoding process, the filter coefficient set corresponding to the 25 types of pixels may be encoded as [1,1,1,1,1,2,2,2, 2,3,4,4,4,4,5,5,5,5,5,5,5,6,6,7,7].

In some embodiments, whether there is a set of combined filter coefficients that is set to zero in the multiple sets of combined filter coefficients in the specific combining combination method may be identified. If the set exists, whether each set of combined filter coefficients in the multiple sets of combined filter coefficients is set to zero may be identified.

For example, after calculating the RD cost, seven sets of combined filter coefficients may be determined, where the first and second sets of filter coefficients may be set to zero, and the other five sets of filter coefficients may not be set to zero. Then the syntax element that identifies whether there is a set of combined filter coefficients that is set to zero may be encoded as 1, and the syntax element that identifies whether each set of combined filter coefficients is set to zero may be encoded as [1,1,0,0,0,0,0].

In another example, after the seven sets of filter coefficients are calculated using the RD cost, none of the seven sets of filter coefficients may be determined to set to zero. Then the syntax element that identifies whether there is a set of filter coefficients that is set to zero may be encoded as 0, and the syntax element that identifies whether each set of filter coefficients is set to zero may not be encoded.

Since in the technical solutions of the embodiments of the present disclosure, there is no need to select an encoding method from multiple encoding methods including the differential encoding method and the differential encoding method. Therefore, there is no need to calculate the RD cost based on the non-differential encoding method and the differential encoding method for multiple sets of combined filter coefficients. Therefore, the time it takes to calculate the minimum RD cost of the specific combining combination method can be greatly reduced.

At the same time, when calculating RD cost, since the flag bits used to identify the encoding method are reduced, the number of bits required for the image encoding frame may not include the number of bits indicating the syntax element of the encoding method of multiple sets of filter coefficients. For example, the number of bits indicating that the encoding for encoding multiple sets of filter coefficients is the differential encoding method or the syntax element of the non-differential encoding method may not be included. In some embodiments, the number of bits of the syntax element indicating the encoding method of the multiple sets of filter coefficients may beat least one.

It can be seen from the above that in the nonlinear ALF filtering process, when the combination determination on multiple sets of initial filter coefficients is made, the clip parameters corresponding to the combined filter coefficients may be calculated based on RD cost, and the clip index parameters corresponding to the clip parameters may need to be coded into the bitstream. In some embodiments, the clip index parameter may be an integer between 0-3.

In the current reference software VTM of the VVC standard, the exponential Golomb encoding method is used to encode the clip index parameters into the bitstream, which requires complex calculations of the exponential Golomb order and a greater number of bits is required for encoding, which affects the coding efficiency.

Figure 9:
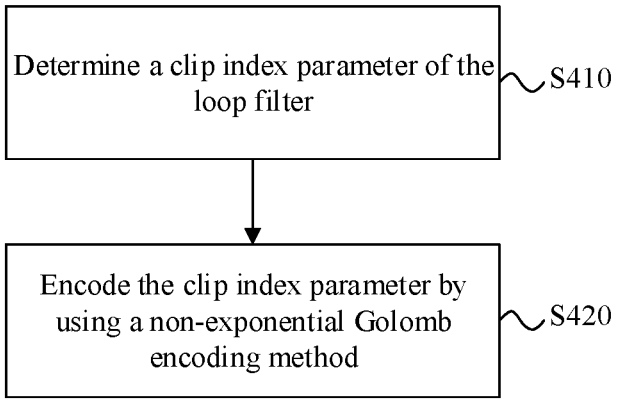
FIG. 9 is a schematic flowchart of the loop filtering method according to another embodiment of the present disclosure.

To solve the foregoing problem, FIG. 9 shows a schematic flowchart of a loop filtering method 400 according to an embodiment of the present disclosure. The method 400 can be executed by the encoding end. For example, the method 400 can be executed by the system 100 shown in FIG. 1 when performing an encoding operation.

410, determining the clip index parameter of the loop filter.

In the embodiments of the present disclosure, the clip index parameter of the loop filter may be the clip index parameter corresponding to the clip parameter in the clip operation in the nonlinear loop filter. In the encoding process, it may be necessary to encode the clip index parameter corresponding to the clip parameter into the bitstream. For the specific nonlinear loop filtering process, reference can be made to the foregoing embodiments, which will not be repeated here.

It should be understood that in the embodiments of the present disclosure, the number of clip index parameter may be equal to the number of clip parameters. Therefore, when there are N clip parameters, different clip index parameter may identify an distinguish different clip parameters. The value range of the clip index parameter may include, but is not limited to, an integer between 0 to N−1, and the value range is not limited in the embodiments of the present disclosure.

It should also be understood that in the embodiments of the present disclosure, the clip index parameter may be only the brightness clip index parameter of the brightness component of the encoded frame, only the chrominance clip index parameter of the chrominance component of the encoded frame, and may also be the clip index parameter shared by the brightness component of the encoded frame and the chrominance component of the encoded frame.

For example, as described above, in the VVC standard, for the brightness component of the encoded frame, the brightness clip parameter may be selected from one of {1024, 181, 32, 6}, and for the chrominance component of the encoded frame, the chrominance component clip parameter may be selected from one of {1024, 161, 25, 4}. At this time, both the brightness component of the encoded frame and the chrominance component of the encoded frame may need to write the clip index parameter code corresponding to the clip parameter into the bitstream.

Except for the above case, in some embodiments, the brightness clip parameter of the brightness component of the encoded frame may be the same as the chrominance clip parameter of the chrominance component of the encoded frame. In some embodiments, the set of brightness clip parameter of the brightness component of the encoded frame and the chrominance clip parameter of the chrominance component of the encoded frame may both be {1024, 181, 32, 6} or may both be {1024, 161, 25, 4}.

In some embodiments, the brightness clip parameter of the brightness component of the encoded frame and the chrominance clip parameter of the chrominance component of the encoded frame may be parameters selected from the same parameter list. In some embodiments, the parameter list may include at least one of the following values: 1024, 181, 32, 6. Or, in some embodiments, the parameter list may include at least one of the following values: 1024, 161, 25, 4.

In some embodiments, the clip parameters for the brightness component of the encoded frame and the chrominance component of the encoded frame may both be selected from {1024, 181, 32, 6} or they may both be selected from {1024, 181, 32}. In particular, the same clip index parameter may correspond to the same clip parameter. That is, when the clip index parameter of the brightness component of the encoded frame is the same as the clip index parameter of the chrominance component of the encoded frame, correspondingly, the clip parameters of the brightness component of the encoded frame may be the same as the clip parameters of the chrominance component of the encoded frame.

For example, when the brightness clip index parameter and the chrominance clip index parameter are 1, the clip parameter of the brightness component of the encoded frame and the clip parameter of the chrominance component of the encoded frame may both be 181. Further, when the brightness clip index parameter and the chrominance clip index parameter are 2, the clip parameter of the brightness component of the encoded frame and the clip parameter of the chrominance component of the encoded frame may both be 32.

In this way, the design of the clip parameters of the chrominance component and the brightness component can be unified, the complexity of the codec can be reduced, and the coding performance can be improved.

S420, encoding the clip index parameter by using a non-exponential Golomb encoding method.

The exponential Golomb encoding method is a variable-length coding method that uses certain rules to construct codewords. The exponential Golomb encoding method divides all numbers into groups of equal size. The group with a smaller symbol value is assigned a shorter code length. The symbol length in the same group is substantially the same, and the size of the group increases exponentially. Further, the exponential Golomb encoding method can be extended to Kth order, that is, the Kth order exponential Golomb encoding method. The following table is a schematic table of Kth order exponential Golomb coding, where x is the to-be-coded value.

TABLE 1

| x | K = 0 | K = 1 | K = 2 | K = 3 |
|---|---|---|---|---|
| 0 | 1 | 10 | 100 | 1000 |
| 1 | 010 | 11 | 101 | 1001 |
| 2 | 011 | 0100 | 110 | 1010 |
| 3 | 00100 | 0101 | 111 | 1011 |
| 4 | 00101 | 0110 | 01000 | 1100 |
| 5 | 00110 | 0111 | 01001 | 1101 |
| 6 | 00111 | 001000 | 01010 | 1110 |
| 7 | 0001000 | 001001 | 01011 | 1111 |
| 8 | 0001001 | 001010 | 01100 | 010000 |
| 9 | 0001010 | 001011 | 01101 | 010001 |

As shown in Table 1, for smaller values, as the to-be-coded value increase, the number of bits of exponential Golomb encoding increases, and the increase is obvious. Therefore, the exponential Golomb encoding method is not suitable for coding smaller values. Compared with non-exponential Golomb encoding methods such as fixed-length code encoding, the exponential Golomb encoding requires more coding bits, and it also needs to calculate the order in the coding and decoding process, the calculation is complicated, and it is not beneficial to improving the coding efficiency.

Therefore, in the embodiments of the present disclosure, the non-exponential Golomb encoding method is used to encode the clip index parameters, and write the encoded parameters into the bitstream, which can avoid the determination of order of the exponential Golomb encoding method, reduce the coding complexity, and improving the calculation speed of the RD cost at the encoding end.

In some embodiments, the non-exponential Golomb encoding method may include, but is not limited to, a fixed-length code encoding method, a unary encoding method, or a truncated unary (TU) coding method.

In the following description, the number of clip index parameters and the corresponding clip index parameters in the VVC standard are both four as an example.

The clip index parameter may use four values to distinguish different clip parameters.

In some embodiments, the four values may be any four different values. Preferably, the value range of the four values may be relatively small, including but not limited to any one of 0-3, 1-4, −1-2, −2-1, or −3-0.

In some embodiments, the fixed-length code encoding method may be used to encode the four numbers.

For example, a 2-bit fixed-length code may be used to encode the four numbers, 0, 1, 2, and 3, where 0 can be encoded as 00, 1 can be encoded as 01, 2 can be encoded as 10, and 3 can be encoded as 11.

It should be understood that the encoded 00, 01, 10, 11 can be used to distinguish four values, and 00, 01, 10, 11 can also identify other values. For example, 00 can also be the code of 1, 2, or 3, and 01 can also be the code of 0, 2, or 3, etc., which is not limited in the embodiments of the present disclosure.

In some embodiments, in addition to the above-mentioned 2-bit fixed-length code to encode the four numbers 0, 1, 2, and 3, a 3-bit or other number of fixed-length codes may also be used to encode the other four numbers. For example, a 3-bit fixed-length code may be used to encode 1-4, etc., which is not limited in the embodiments of the present disclosure.

In some embodiments, the unary encoding method may be used to encode the four numbers.

In some embodiments, the four numbers 0, 1, 2, and 3 may be encoded using the unary encoding method. For a non-binary unsigned integer value symbol $x \geq 0$, the unary code word may consist of x "1" bits plus an ending "0" bit. For example, the unary encoding method can be used to encode the four numbers 0, 1, 2, and 3 to obtain 0, 10, 110, and 1110.

In some embodiments, the truncated unary encoding method may be used to distinguish the four numbers.

In some embodiments, the truncated unary encoding method may be used to encode the four numbers 0, 1, 2, and 3 with a known truncated value S. For a non-binary unsinged integer value symbol $0 \leq x < S$, the unary code can be used for binarization. For a non-binary unsinged integer value symbol $x = S$, the binarization result may be all composed of 1 with a length of S. For example, when the truncated value S=3, the four numbers 0, 1, 2, and 3 can be encoded using the truncated unary encoding method to obtain 0, 10, 110, and 111.

In particular, when the clip parameter is selected from 1024, 181, 32, and 6, the four index parameters may correspond to one of 1024, 181, 32, and 6, respectively. In some embodiments, the four index parameters may be correspondingly identified in a certain order. For example, the index parameter 0 may correspond to 1024, the index parameter 1 may correspond to 181, the index parameter 2 may correspond to 32, and the index parameter 3 may correspond to 6; or the index parameter 3 may correspond to 1024, the index parameter 2 may correspond to 181, the index parameter 1 may correspond to 32, and the index parameter 0 may correspond to 6.

In some embodiments, the four index parameters may not be identified in a certain order, but correspondingly identified randomly. For example, the index parameter 0 may correspond to 1024, the index parameter 2 may correspond to 181, the index parameter 1 may correspond to 32, and the index parameter 3 may correspond to 6; or, the index parameter 2 may correspond to 1024, the index parameter 3 may correspond to 181, the index parameter 0 may correspond to 32, and the index parameter 1 may correspond to 6, etc., which is not limited in the embodiments of the present disclosure.

It should be understood that when the clip parameter is selected from 1024, 161, 25, and 4, the four index parameters may correspond to one of 1024, 161, 25, and 4 respectively, and for the identification corresponding method, reference can be made to the above identification method, which will not be repeated here.

It should also be understood that when in other video standards or technical solutions, the number of clip parameters for loop filtering may be N, and the clip index parameter may use N values to distinguish different clip parameters. Any one of the fixed-length code encoding method, the unary encoding method, or the truncated unary encoding method may be used to encode the N values to distinguish them. For the coding method of the N values and the corresponding relationship between the N values and the clip parameters, reference can be made to encoding method of the four numbers and the corresponding relationship with the clip parameters in the VVC standard described above, which will not be repeated here.

In some embodiments, the number of coding bits of the non-exponential Golomb encoding method such as the fixed-length code encoding method, the unary encoding method, or the truncated unary encoding method may not be more than four. When the number of bits of the non-exponential Golomb encoding method is less than the number of bits of the exponential Golomb encoding method, the coding efficiency of encoding and decoding can be improved, and the coding speed can be accelerated.

Figure 10:
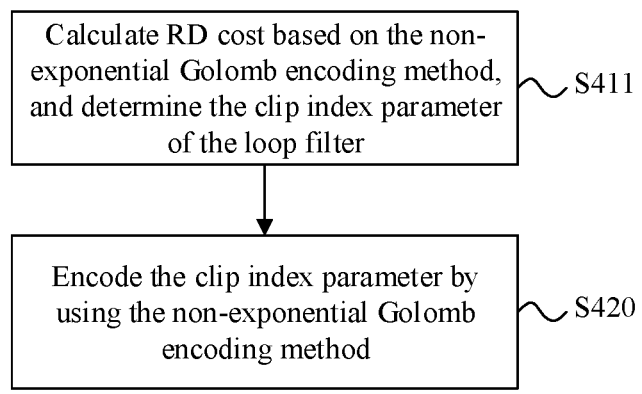
FIG. 10 is a schematic flowchart of the loop filtering method according to another embodiment of the present disclosure.

In some embodiments, as shown in FIG. 10, in the embodiments of the present disclosure, determining the clip index parameter of the loop filter in the process at S410 may include the following process.

S411, calculating the RD cost based on the non-exponential Golomb encoding method to determine the clip index parameters of the loop filter.

More specifically, the clip parameter corresponding to each filter coefficient of the loop filter and the corresponding clip index parameter can be determined by calculating the RD cost based on the non-exponential Golomb encoding method.

As described above, in nonlinear loop filtering, each filter coefficient may correspond to a clip parameter. In the coefficient combining decision process, the N sets of filter coefficients can be combined in different ways and preliminary decision can be made to obtain a total of V combining combinations. Based on the Wiener filtering principle, multiple sets of combined filter coefficients can be recalculated under V combining combinations. In some embodiments, N may be a positive integer not greater than 25.

In the embodiments of the present disclosure, based on the recalculated multiple sets of combined filter coefficients under V combining combinations, the clip parameter corresponding to each filter coefficient in the multiple sets of combined filter coefficients may be obtained based on the RD cost calculation. In the RD cost calculation process, the encoding method of the clip index parameter corresponding to the clip parameter may be the non-exponential Golomb encoding method, such as the fixed-length code encoding method, etc.

In the RD cost calculation process, the number of bits calculated based on the non-exponential Golomb encoding method may be less than the number of bits calculated based on the exponential Golomb encoding method, and there may be no need to determine the order of the exponential Golomb, thereby reducing the RD cost calculation time, which is beneficial to improving the coding efficiency.

Figure 11:
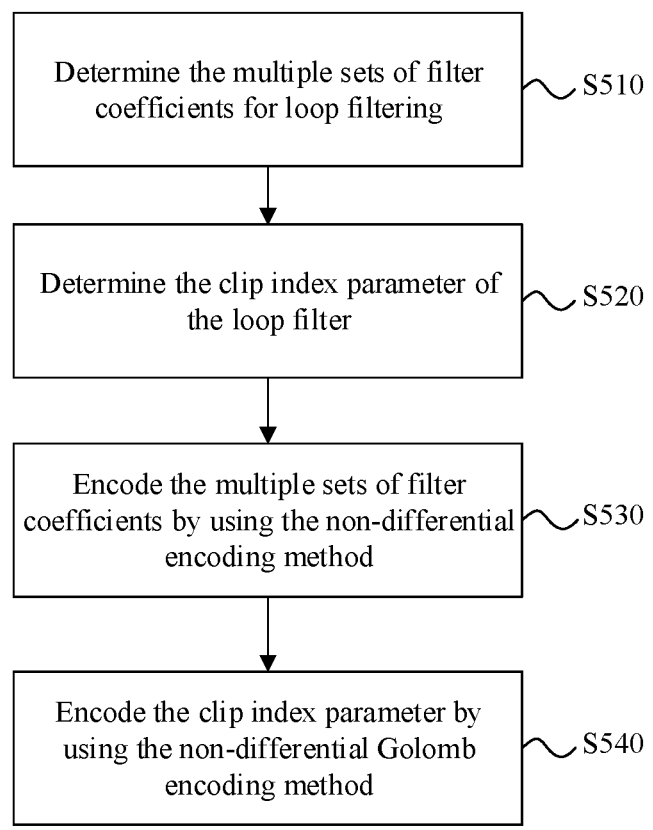
FIG. 11 is a schematic flowchart of the loop filtering method according to another embodiment of the present disclosure.

In some embodiments, as shown in FIG. 11, in an embodiment of the present disclosure, a loop filtering method 500 may include the following processes.

S510, determining the multiple sets of filter coefficients of the loop filter.

S520, determining the clip index parameters of the loop filter.

S530, encoding the multiple sets of filter coefficients by using the non-exponential encoding method.

S540, encoding the clip index parameters by using the non-exponential Golomb encoding method.

In some embodiments, the process at S510 may be the same as or similar to the processes at S210 and S310 in the foregoing loop filtering method 200 and loop filtering method 300, and the process at S520 may be the same as or similar to the foregoing processes at S220 and S330. In some embodiments, the processes at S530 and S540 may be the same as or similar to processes at S410 and S420 in the foregoing loop filtering method 400. For the specific implementation method, reference can be made to the aforementioned technical solutions, which will not be repeated here.

In the embodiments of the present disclosure, the encoding method of multiple sets of filter coefficients in the loop filter and the encoding method of the clip index parameters can be optimized. Without affecting the encoding quality, the coding efficiency can be improved from two aspects, and the coding speed can be accelerated.

The above describes the technical solutions of the embodiments of the present disclosure from the perspective of the encoding end, and the following describes the technical solutions of the embodiments of the present disclosure from the perspective of the decoding end. It should be understood that, in addition to the following description, for the general description of the encoding end and the decoding end, reference can be made to the previous description, and for brevity, the details are not repeated.

Figure 12:
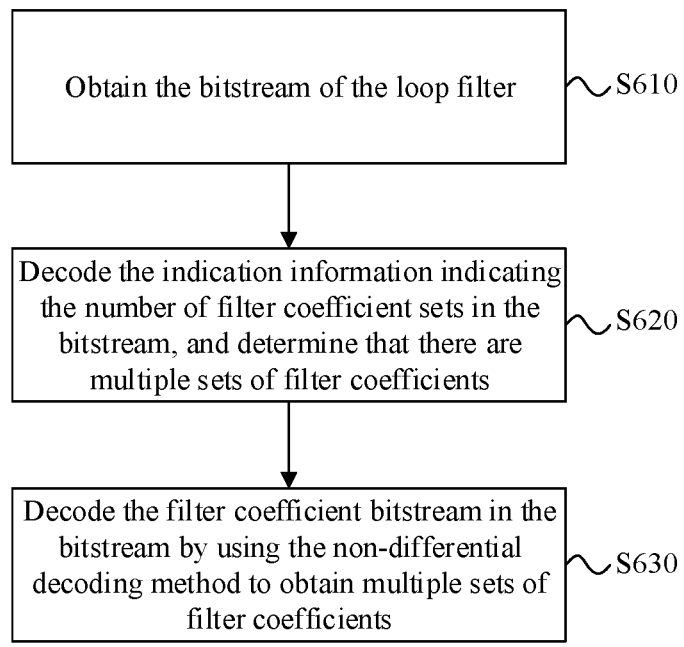
FIG. 12 is a schematic flowchart of the loop filtering method according to another embodiment of the present disclosure.

FIG. 12 shows a schematic flowchart of a loop filtering method 600 according to an embodiment of the present disclosure. The method 600 may be executed by the decoding end. For example, the method 600 can be executed by the system 100 shown in FIG. 1 when performing a decoding operation. The method will be described in detail below.

S610, obtaining a bitstream of the loop filter.

S620, decoding indication information indicating the number of filter coefficient sets in the bitstream, and determining that there are multiple sets of filter coefficients.

In the embodiments of the present disclosure, since the pixels in the decoded frame may be divided into multiple types, and one type of pixels may correspond to a set of filter coefficients, therefore, the loop filter bitstream may include indication information indicating the number of filter coefficient sets. For example, in the reference software VTM of the VVC standard, the indication information of MAX_NUM_ALF_CLASSES can be decoded to obtain the number of sets of filter coefficients in the loop filter. When the number of sets is greater than one, that is, where it is determined that there are multiple sets of filter coefficients, the processes at S630 may be performed.

S630, using a non-differential decoding method to decode a filter coefficient bitstream in the bitstream to obtain multiple sets of filter coefficients.

More specifically, since the encoding end may directly use the non-differential encoding method for encoding, correspondingly, the decoding end may use the non-differential decoding method to directly decode the filter coefficient bitstream, and the obtained multiple sets of filter coefficients may not need to be processed by other calculations, and may be directly used for filtering operations. However, when differential decoding method is used for decoding the decoded value obtained needs to be calculated and processed to obtain multiple sets of filter coefficients for filtering, and the dependence between multiple sets of filter coefficients is strong. When an error occurs in the data transmission process, it will have a greater impact on the multiple sets of filter coefficients at the decoding end, which is not beneficial to the filtering effect and image quality. Therefore, compared with the differential decoding method, the non-differential decoding method is used to filter the filter coefficient bitstream to improve the quality of the loop filtered image at the decoding end.

In some embodiments, the non-differential decoding method may include exponential Golomb decoding method, fixed-length decoding method, unary decoding method, etc.

Preferably, in the embodiments of the present disclosure, the multiple sets of filter coefficients may be decoded using the exponential Golomb decoding method.

In some embodiments, before the non-differential decoding method is used to decode the filter coefficient bitstream in the bitstream, the encoding method of the filter coefficient bitstream may not be decoded.

In some embodiments, the bitstream may include a syntax element bitstream indicating the encoding method of the filter coefficient bitstream, but the syntax element bitstream may not be decoded.

In some embodiments, the bitstream may not include a syntax element bitstream indicating the encoding method of the filter coefficient bitstream at all.

In some embodiments, the bitstream may not include a syntax element bitstream indicating that the encoding method of the filter coefficient bitstream is a differential encoding method or a non-differential encoding method.

For example, in the VVC standard, the "alf_luma_coeff_delta_prediction_flag" syntax flag bit may be used to identify whether the encoding method of the loop filter ALF in the brightness component of the image frame is differential encoding or non-differential encoding. The syntax flag may be an unsigned integer, which occupies one bit.

In the embodiments of the present disclosure, the bitstream may not include the bitstream of the "alf_luma_coeff_delta_prediction_flag" syntax element, and there may be no need to decode the bitstream of the syntax element, which reduces the decoding time.

It should be understood that the syntax element bitstream indicating the encoding method of the filter coefficient bitstream in the embodiments of the present disclosure ma be the syntax element bitstream for decoding the brightness component of the frame, or the syntax element bitstream for decoding the chrominance component of the frame, which is not limited in the embodiments of the present disclosure.

It should also be understood that the embodiments of the present disclosure may also be applied to other coding standards or coding technical solutions that use loop filter ALF other the VVC, which is also not limited in the embodiments of the present disclosure.

In some embodiments, the multiple sets of filter coefficients may correspond to the multiple sets of filter coefficients in the loop filtering method 200 and the loop filtering method 300, which will not be repeated here.

Figure 13:
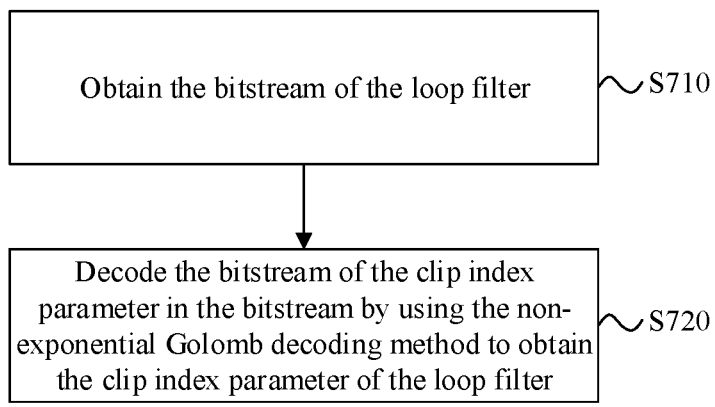
FIG. 13 is a schematic flowchart of the loop filtering method according to another embodiment of the present disclosure.

FIG. 13 shows a schematic flowchart of a loop filtering method 700 at a decoding end according to another embodiment of the present disclosure. The loop filtering method 700 is a nonlinear loop filtering method. The loop filtering method 700 will be described in detail below.

S710, obtaining the bitstream of the loop filter.

S720, using the non-exponential Golomb decoding method to decode the bitstream of the clip index parameter in the bitstream to obtain the clip index parameter of the loop filter.

In the embodiments of the present disclosure, the clip index parameter of the loop filter may be the clip index parameter corresponding to the clip parameter in the clip operation in the nonlinear loop filter.

In the embodiments of the present disclosure, for the clip index parameter obtained by decoding, reference can be made to the clip index parameter in the aforementioned encoding end loop filtering method 400, which will not be repeated here.

It should be understood that in the embodiments of the present disclosure, the number of clip index parameter may be equal to the number of clip parameters. Therefore, when there are N clip parameters, N clip index parameters may also be obtained by decoding. The value range of the clip index parameter may include, but is not limited to, an integer between 0 to N−1, and the value range is not limited in the embodiments of the present disclosure.

It should also be understood that in the embodiments of the present disclosure, the clip index parameter obtained by decoding may be only the brightness clip index parameter of the brightness component of the decoded frame, only the chrominance clip index parameter of the chrominance component of the decoded frame, and may also be the clip index parameter shared by the brightness component of the decoded frame and the chrominance component of the decoded frame.

For example, in the VVC standard, the corresponding brightness clip parameter obtained by decoding the brightness clip index bitstream of the brightness component of the decoded frame may be one of {1024, 181, 32, 6}, and the corresponding chrominance clip parameter obtained by decoding the chrominance clip index parameter bitstream of the chrominance component of the decoded frame may be one of {1024, 161, 25, 4}.

Except for the above case, in some embodiments, the brightness clip parameter of the brightness component of the decoded frame may be the same as the chrominance clip parameter of the chrominance component of the decoded frame. In some embodiments, the set of brightness clip parameter of the brightness component of the decoded frame and the chrominance clip parameter of the chrominance component of the decoded frame may both be {1024, 181, 32, 6} or may both be {1024, 161, 25, 4}.

In some embodiments, the brightness clip parameter of the brightness component of the decoded frame and the chrominance clip parameter of the chrominance component of the decoded frame may be parameters in the same parameter list. In some embodiments, the parameter list may include at least one of the following values: 1024, 181, 32, 6. Or, in some embodiments, the parameter list may include at least one of the following values: 1024, 161, 25, 4.

In some embodiments, the clip parameters for the brightness component of the decoded frame and the chrominance component of the decoded frame may both be selected from {1024, 181, 32, 6} or they may both be selected from {1024, 181, 32}. In particular, the same clip index parameter may correspond to the same clip parameter. That is, when the clip index parameter of the brightness component of the decoded frame is the same as the clip index parameter of the chrominance component of the decoded frame, correspondingly, the clip parameters of the brightness component of the decoded frame may be the same as the clip parameters of the chrominance component of the decoded frame.

For example, when the brightness clip index parameter and the chrominance clip index parameter obtained from decoding are both 1, the clip parameter of the brightness component of the encoded frame and the clip parameter of the chrominance component of the encoded frame may both be 181. Further, when the brightness clip index parameter and the chrominance clip index parameter obtained from decoding are both 2, the clip parameter of the brightness component of the encoded frame and the clip parameter of the chrominance component of the encoded frame may both be 32.

By using this method for decoding, the decoding process can be simplified, the decoding speed can be accelerated, and the decoding performance can be improved.

In the embodiments of the present disclosure, the non-exponential Golomb decoding method can be used for decoding to avoid the calculation of the exponential Golomb order at the decoding end, improve the decoding speed, and optimize the decoding performance.

In some embodiments, the non-exponential Golomb decoding method may include, but is not limited to, a fixed-length code decoding method, a unary decoding method, or a truncated unary decoding method. The fixed-length code decoding method, unary decoding method, and truncated unary decoding method are the inverse process of the aforementioned fixed-length code encoding method, unary encoding method, and truncated unary encoding method.

More specifically, in the VVC standard, the number of clip index parameters and the corresponding clip index parameters in the VVC standard are both four as an example for description.

In some embodiments, the fixed-length code decoding method may be used to decode the clip index parameter bitstream.

For example, the clip index parameter bitstream corresponding to the clip index parameter may be a 2-bit bitstream, and the 2-bit bitstream may be one or 00, 01, 10, or 11. For 00, 01, 10, and 11, fixed-length code decoding may be used to obtain the corresponding clip index parameters as 0, 1, 2, and 3.

In some embodiments, based on the specific fixed-length code decoding rules, 00 may also be decoded as 1, 2, or 3, 01 may also be decoded as 0, 2, 3, etc., which is not limited in the embodiments of the present disclosure.

In some embodiments, in addition to the above-mentioned clip index parameter bitstream which is a 2-bit fixed-length bitstream, the clip index parameter bitstream may also be a bitstream of 3-bit or other numbers of bits. For example, a 3-bit bitstream may be decoded to obtain 1-4, etc., which is not limited in the embodiments of the present disclosure.

In some embodiments, the unary decoding method may be used to decode the clip index parameter bitstream.

In some embodiments, the clip index parameter bitstream corresponding to the clip index parameter may be one of 0, 10, 110, or 1110, and the unary decoding method may be used to decode 0, 10, 110, and 1000 to obtain the corresponding clip index parameters as 0, 1, 2, and 3.

In some embodiments, the truncated unary decoding method may be used to decode the clip index parameter bitstream.

In some embodiments, the clip index parameter bitstream corresponding to the clip index parameter may be one of 0, 10, 110, or 111, and the truncated unary decoding method may be used to decode 0, 10, 110, and 1000 to obtain the corresponding clip index parameters as 0, 1, 2, and 3.

In particular, when the clip parameter is one of 1024, 181, 32, and 6, the four index parameters may correspond to one of 1024, 181, 32, and 6, respectively. In some embodiments, the four index parameters may be correspondingly identified in a certain order. For example, the index parameter 0 may correspond to 1024, the index parameter 1 may correspond to 181, the index parameter 2 may correspond to 32, and the index parameter 3 may correspond to 6; or the index parameter 3 may correspond to 1024, the index parameter 2 may correspond to 181, the index parameter 1 may correspond to 32, and the index parameter 0 may correspond to 6.

In some embodiments, the four index parameters may not be identified in a certain order, but correspondingly identified randomly. For example, the index parameter 0 may correspond to 1024, the index parameter 2 may correspond to 181, the index parameter 1 may correspond to 32, and the index parameter 3 may correspond to 6; or, the index parameter 2 may correspond to 1024, the index parameter 3 may correspond to 181, the index parameter 0 may correspond to 32, and the index parameter 1 may correspond to 6, etc., which is not limited in the embodiments of the present disclosure.

It should be understood that when the clip parameter is one of 1024, 161, 25, and 4, the four index parameters may correspond to one of 1024, 161, 25, and 4 respectively, and for the identification corresponding method, reference can be made to the above identification method, which will not be repeated here.

It should also be understood that when in other video standards or technical solutions, one of the N values may be obtained by decoding the clip index parameter bitstream corresponding to a clip index parameter. Any one of the fixed-length code decoding method, the unary decoding method, or the truncated unary decoding method may be used to decoding the clip index parameter bitstream. For the decoding method of the N values and the corresponding relationship between the N values and the clip parameters, reference can be made to decoding method of the four numbers and the corresponding relationship with the clip parameters in the VVC standard described above, which will not be repeated here.

In some embodiments, the number of decoded bits of the non-exponential Golomb decoding method such as the fixed-length code decoding method, the unary decoding method, or the truncated unary decoding method may not be more than four. When the number of bits of the non-exponential Golomb decoding method is less than the number of bits of the exponential Golomb decoding method, the coding efficiency of encoding and decoding can be improved, and the coding speed can be accelerated.

Figure 14:
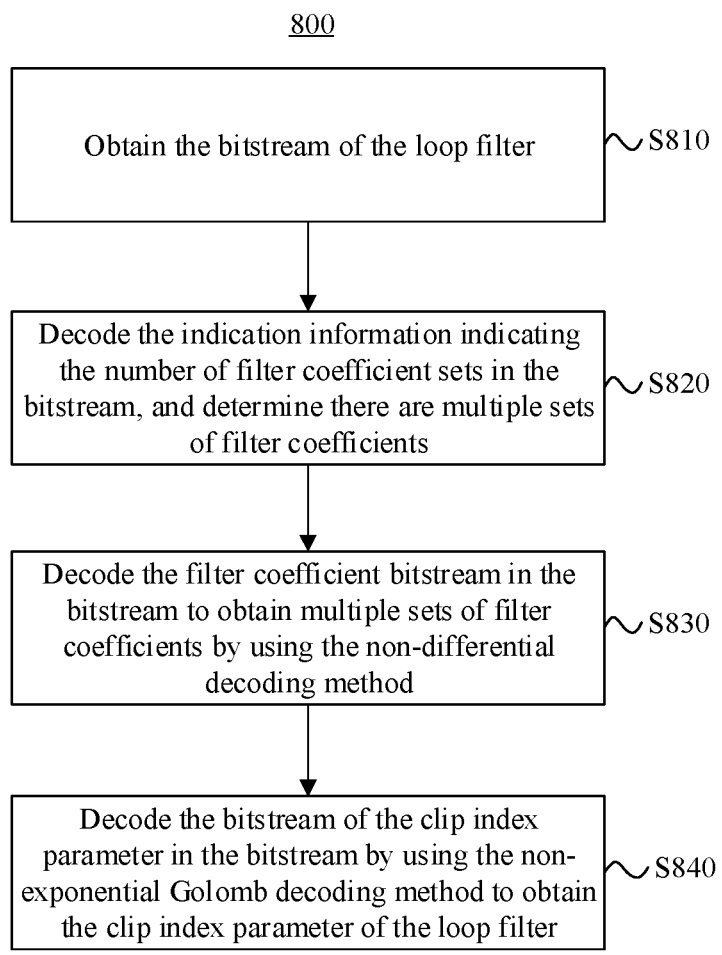
FIG. 14 is a schematic flowchart of the loop filtering method according to another embodiment of the present disclosure.

FIG. 14 shows a schematic flowchart of a loop filtering method 800 at a decoding end according to another embodiment of the present disclosure.

As shown in FIG. 14, in an embodiment of the present disclosure, the loop filtering method 800 includes the following processes.

S810, obtaining the bitstream of the loop filter.

S820, decoding the indication information indicating the number of filter coefficient sets in the bitstream, and determining that there are multiple sets of filter coefficients.

S830, using the non-differential decoding method to decode a filter coefficient bitstream in the bitstream to obtain multiple sets of filter coefficients.

S840, using the non-exponential Golomb decoding method to decode the bitstream of the clip index parameter in the bitstream to obtain the clip index parameter of the loop filter.

In some embodiments, the processes at S810, S820, and S830 may be the same as or similar to the processes at S610, S620, and S630 in the foregoing loop filtering method 600, and the process at S840 may be the same as or similar to the foregoing process at S720 in the foregoing loop filtering method 700. For the specific implementation method, reference can be made to the aforementioned technical solutions, which will not be repeated here.

In the embodiments of the present disclosure, the decoding method for multiple sets of filter coefficients in loop filtering and eh decoding method for the clip index parameters are optimized, which improves the decoding efficiency from two aspects, and speeds up the decoding speed.

Figure 15:
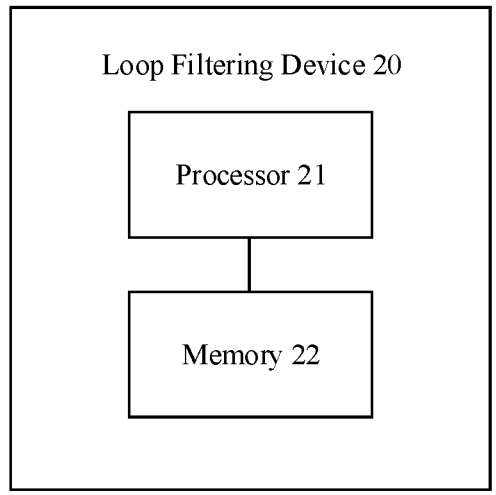
FIG. 15 is a schematic block diagram of a loop filtering device according to an embodiment of the present disclosure.
Figure 16:
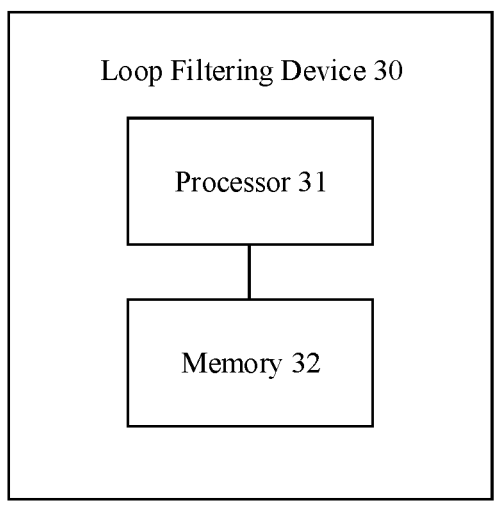
FIG. 16 is a schematic block diagram of the loop filtering device according to another embodiment of the present disclosure.

The foregoing description describes the encoding-end loop filtering method embodiments of the present disclosure in detail with reference to FIGS. 6-11, and the following description describes the encoding loop filtering device embodiments of the present disclosure with reference to FIGS. 15-16. It should be understood that the device embodiments and the method embodiments correspond to each other, and for similar descriptions, reference can be made to the method embodiments.

FIG. 15 is a schematic block diagram of a loop filtering device 20 at the encoding end according to an embodiment of the present disclosure. In some embodiments, the loop filtering device 20 may correspond to the loop filtering method 200 or 300. In some embodiments, the loop filtering device 20 may also correspond to the loop filtering method in which the loop filtering methods 200 and 400 are combined, or the loop filtering method in which the loop filtering methods 300 and 400 are combined, or the loop filtering method 500.

As shown in FIG. 15, the loop filtering device 20 includes a processor 21 and a memory 22.

The memory 22 may store programs, and the processor 21 may be configured to execute the programs stored in the memory to determine multiple sets of filter coefficients for loop filtering, and using the non-differential encoding method to encode the multiple sets of filter coefficients.

In some embodiments, the processor 21 may be a processor or a controller of an electronic device where the loop filtering device 20 is positioned.

In some embodiments, the processor 21 may be configured to not select the encoding method of the multiple sets of filter coefficients before encoding the multiple sets of filter coefficients by using the non-differential encoding method.

In some embodiments, the syntax element of the loop filter may not include a syntax element indicating the encoding method of the multiple sets of filter coefficients.

In some embodiments, the syntax element of the loop filter may not include a syntax element indicating that the encoding method of the multiple sets of filter coefficients is the differential encoding method or the non-differential encoding method.

In some embodiments, the flag bit of the syntax element indicating that the encoding method of the multiple sets of filter coefficients is the differential encoding method or the non-differential encoding method may be 0 or 1.

In some embodiments, the processor 21 may be configured to calculate the RD cost of the encoded frame not based on the encoding method of the multiple sets of filter coefficients, and not select the encoding method of the multiple sets of filter coefficients based on the minimum RD cost.

In some embodiments, the processor 21 may be configured to not calculate the RD cost of the encoded frame based on the differential encoding method and the non-differential encoding method, and not select the differential encoding method or the non-differential encoding method based on the minimum RD cost.

In some embodiments, the processor 21 may be configured to write the encoded values of the multiple sets of filter coefficients into a bitstream after the multiple sets of filter coefficients are encoded using the exponential Golomb encoding method.

In some embodiments, the processor 21 may be configured to combine the filter coefficients in the multiple sets of initial filter coefficients by using multiple combining combination methods, and calculate the multiple combined combination filter coefficients in each of the multiple combining combination methods; determine whether to set the filter coefficients in the multiple sets of combined filter coefficients to zero, and obtain the multiple sets of combined filter coefficients that are not set to zero in each of the multiple combining combination methods; and determine a specific combining combination method in the multiple combining combination methods to obtain the multiple sets of specific combined filter coefficients that are not set to zero in the specific combining combination method.

In some embodiments, the processor 21 may be configured to use different selection methods to select the combined filter coefficients from the multiple combined filter coefficients and set them to zero to obtain different combinations of zero-setting filter coefficients; and based on the non-differential encoding method, calculate the RD cost of the encoded frame under different combinations of zero-setting filter coefficients, and determine the multiple sets of filter coefficients that are not set to zero under the combination of zero-setting filter coefficients with the minimum RD cost.

In some embodiments, the processor 21 may be configured to calculate the RD cost of the encoded frame in the multiple combining combination methods based on the non-differential encoding method to determine multiple sets of specific combined filter coefficients that are not set to zero in the specific combining combination method with the minimum RD cost.

In some embodiments, the processor 21 may be configured to calculate the RD cost based on the number of bits required for encoding the encoded frame, where the number of bits required for encoding the encoded frame may not include the number of bits of the syntax element indicating that the encoding method of the multiple sets of filter coefficients is the differential encoding method or the non-differential encoding method.

In some embodiments, the multiple sets of filter coefficients may be N sets of filter coefficients of the brightness component of the encoded frame, where N may be a positive integer less than or equal to 25.

In some embodiments, the multiple sets of filter coefficients may be filter coefficients calculated based on the CTU.

In some embodiments, each set of filter coefficients in the multiple sets of filter coefficients may include 13 values.

In some embodiments, the loop filter may be a nonlinear loop filter, and the processor 21 may be further configured to determine the clip index parameter of the nonlinear loop filter; and use the non-exponential Golomb encoding method to encode the clip index parameter.

In some embodiments, the value of the clip index parameter may be an integer between 0-3.

In some embodiments, the number of coding bits of the non-exponential Golomb encoding method may not be more than four.

In some embodiments, the non-exponential Golomb encoding method may be a fixed-length code encoding method, a unary encoding method, or a truncated unary encoding method.

In some embodiments, the non-exponential Golomb encoding method may be the fixed-length code encoding method, and the number of coding bits of the fixed-length code encoding method may be 2.

In some embodiments, the non-exponential Golomb encoding method may be the truncated unary encoding method, and the number of coding bits of the truncated unary encoding method may not be greater than 3.

In some embodiments, the processor 21 may be configured to calculate the RD cost of the encoded frame based on the non-exponential Golomb encoding method before encoding the clip index parameter by using the non-exponential Golomb encoding method.

In some embodiments, the processor 21 may be configured to not calculate the RD cost of the encoded frame based on the exponential Golomb encoding method before using the non-exponential Golomb encoding method to encode the clip index parameter.

In some embodiments, the processor 21 may be configured to write the encoded value of the clip index parameter into the bitstream after the clip index parameter is encoded using the non-exponential Golomb encoding method.

In some embodiments, one clip index parameter may correspond to one loop filter clip parameter, and one loop filter clip parameter may correspond to one filter coefficient in the multiple sets of filter coefficients. The loop filter may be performed based multiple loop filter clip parameters and multiple sets of filter coefficients.

In some embodiments, the clip index parameter may include the brightness clip index parameter of the brightness component of the encoded frame and the chrominance clip index parameter of the chrominance component of the encoded frame. The brightness clip index parameter may correspond to the brightness loop filter clip parameter of the brightness component of the encoded frame, and the chrominance clip index parameter may correspond to the chrominance loop filter clip parameter of the chrominance component of the encoded frame. When the brightness clip index parameter is the same as the chrominance clip index parameter, the brightness loop filter clip parameter may be the same as the chrominance loop filter clip parameter.

In some embodiments, the brightness loop filter clip parameter and the chrominance loop filter clip parameter may be parameters selected from the same parameter list.

In some embodiments, the parameter list may include at least one of the following values: 1024, 181, 32, or 6.

FIG. 16 is a schematic block diagram of another loop filtering device 30 at the encoding end according to an embodiment of the present disclosure. The loop filtering device 30 may be a loop filtering device in a video encoding end. In some embodiments, the loop filtering device 20 may correspond to the loop filtering method 400. In some embodiments, the loop filtering device 30 may correspond to the loop filtering method in which the loop filtering methods 400 and 200 are combined, the loop filtering method in which the loop filtering methods 400 and 300 are combined, or the loop filtering method 500.

As shown in FIG. 16, the loop filtering device 30 includes a processor 31 and a memory 32.

The memory 32 may store programs, and the processor 31 may be configured to execute the programs stored in the memory to determine the clip index parameter of the loop filter; and use the non-exponential Golomb encoding method to encode the clip index parameter.

In some embodiments, the value of the clip index parameter may be an integer between 0-3.

In some embodiments, the number of coding bits of the non-exponential Golomb encoding method may not be more than four.

In some embodiments, the non-exponential Golomb encoding method may be a fixed-length code encoding method, a unary encoding method, or a truncated unary encoding method.

In some embodiments, the non-exponential Golomb encoding method may be the fixed-length code encoding method, and the number of coding bits of the fixed-length code encoding method may be 2.

In some embodiments, the non-exponential Golomb encoding method may be the truncated unary encoding method, and the number of coding bits of the truncated unary encoding method may not be greater than 3.

In some embodiments, the processor 31 may be configured to calculate the RD cost of the encoded frame based on the non-exponential Golomb encoding method before encoding the clip index parameter by using the non-exponential Golomb encoding method.

In some embodiments, the processor 31 may be configured to not calculate the RD cost of the encoded frame based on the exponential Golomb encoding method before using the non-exponential Golomb encoding method to encode the clip index parameter.

In some embodiments, the processor 31 may be configured to write the encoded value of the clip index parameter into the bitstream after the clip index parameter is encoded using the non-exponential Golomb encoding method.

In some embodiments, the processor 31 may be further configured to determine multiple sets of filter coefficients of the loop filter, and encode the multiple sets of filter coefficients using the non-differential encoding method.

In some embodiments, the processor 31 may be configured to not select the encoding method of the multiple sets of filter coefficients before encoding the multiple sets of filter coefficients by using the non-differential encoding method.

In some embodiments, the syntax element of the loop filter may not include a syntax element indicating the encoding method of the multiple sets of filter coefficients.

In some embodiments, the syntax element of the loop filter may not include a syntax element indicating that the encoding method of the multiple sets of filter coefficients is the differential encoding method or the non-differential encoding method.

In some embodiments, the flag bit of the syntax element indicating that the encoding method of the multiple sets of filter coefficients is the differential encoding method or the non-differential encoding method may be 0 or 1.

In some embodiments, the processor 31 may be configured to calculate the RD cost of the encoded frame not based on the encoding method of the multiple sets of filter coefficients, and select the encoding method of the multiple sets of filter coefficients not based on the minimum RD cost.

In some embodiments, the processor 31 may be configured to calculate RD cost of the encoded frame not based on the differential encoding method and the non-differential encoding method, and select the differential encoding method and the non-differential encoding method not based on the minimum RD cost.

In some embodiments, the processor 31 may be configured to write the encoded values of the multiple sets of filter coefficients into a bitstream after the multiple sets of filter coefficients are encoded using the exponential Golomb encoding method.

In some embodiments, the processor 31 may be configured to combine the filter coefficients in the multiple sets of initial filter coefficients by using multiple combining combination methods, and calculate the multiple combined combination filter coefficients in each of the multiple combining combination methods; determine whether to set the filter coefficients in the multiple sets of combined filter coefficients to zero, and obtain the multiple sets of combined filter coefficients that are not set to zero in each of the multiple combining combination methods; and determine a specific combining combination method in the multiple combining combination methods to obtain the multiple sets of specific combined filter coefficients that are not set to zero in the specific combining combination method.

In some embodiments, the processor 31 may be configured to use different selection methods to select the combined filter coefficients from the multiple combined filter coefficients and set them to zero to obtain different combinations of zero-setting filter coefficients; and based on the non-differential encoding method, calculate the RD cost of the encoded frame under different combinations of zero-setting filter coefficients, and determine the multiple sets of filter coefficients that are not set to zero under the combination of zero-setting filter coefficients with the minimum RD cost.

In some embodiments, the processor 31 may be configured to calculate the RD cost of the encoded frame in the multiple combining combination methods based on the non-differential encoding method to determine multiple sets of specific combined filter coefficients that are not set to zero in the specific combining combination method with the minimum RD cost.

In some embodiments, the processor 31 may be configured to calculate the RD cost based on the number of bits required for encoding the encoded frame, where the number of bits required for encoding the encoded frame may not include the number of bits of the syntax element indicating that the encoding method of the multiple sets of filter coefficients is the differential encoding method or the non-differential encoding method.

In some embodiments, the multiple sets of filter coefficients may be N sets of filter coefficients of the brightness component of the encoded frame, where N may be a positive integer less than or equal to 25.

In some embodiments, the multiple sets of filter coefficients may be filter coefficients calculated based on the CTU.

In some embodiments, each set of filter coefficients in the multiple sets of filter coefficients may include 13 values.

In some embodiments, one clip index parameter may correspond to one loop filter clip parameter, and one loop filter clip parameter may correspond to one filter coefficient in the multiple sets of filter coefficients. The loop filter may be performed based multiple loop filter clip parameters and multiple sets of filter coefficients.

In some embodiments, the loop filter may be a nonlinear loop filter, and the clip index parameter may include the brightness clip index parameter of the brightness component of the encoded frame and the chrominance clip index parameter of the chrominance component of the encoded frame. The brightness clip index parameter may correspond to the brightness loop filter clip parameter of the brightness component of the encoded frame, and the chrominance clip index parameter may correspond to the chrominance loop filter clip parameter of the chrominance component of the encoded frame. When the brightness clip index parameter is the same as the chrominance clip index parameter, the brightness loop filter clip parameter may be the same as the chrominance loop filter clip parameter.

In some embodiments, the brightness loop filter clip parameter and the chrominance loop filter clip parameter may be parameters selected from the same parameter list.

In some embodiments, the parameter list may include at least one of the following values: 1024, 181, 32, or 6.

Figure 17:
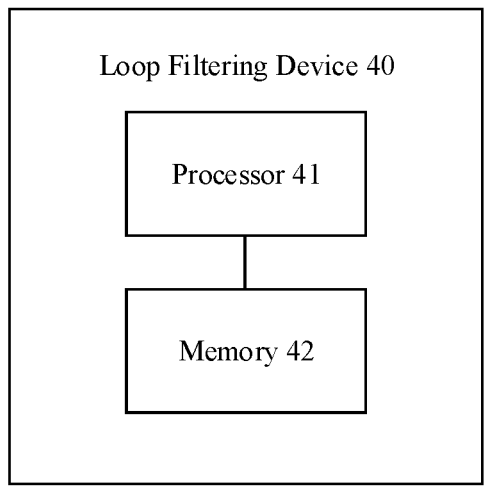
FIG. 17 is a schematic block diagram of the loop filtering device according to another embodiment of the present disclosure.
Figure 18:
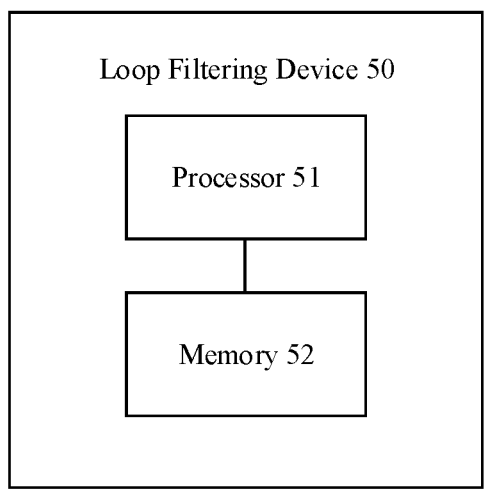
FIG. 18 is a schematic block diagram of a loop filtering device according to another embodiment of the present disclosure.

The foregoing description describes the decoding-end loop filtering method embodiments of the present disclosure in detail with reference to FIGS. 12-14, and the following description describes the decoding loop filtering device embodiments of the present disclosure with reference to FIGS. 17-18. It should be understood that the device embodiments and the method embodiments correspond to each other, and for similar descriptions, reference can be made to the method embodiments.

FIG. 17 is a schematic block diagram of a loop filtering device 40 at the decoding end according to an embodiment of the present disclosure. In some embodiments, the loop filtering device 40 may correspond to the loop filtering method 600. In some embodiments, the loop filtering device 40 may also correspond to the loop filtering method in which the loop filtering methods 600 and 700 are combined, or the loop filtering method 800.

As shown in FIG. 17, the loop filtering device 40 includes a processor 41 and a memory 42.

The memory 42 may store programs, and the processor 41 may be configured to execute the programs stored in the memory to obtain the bitstream of the loop filter, decode the indication information indicating the number of filter coefficient sets in the bitstream and determine that there are multiple sets of filter coefficients, and use the non-differential decoding method to decode a filter coefficient bitstream in the bitstream to obtain multiple sets of filter coefficients.

In some embodiments, the processor 41 may be configured to not decode the encoding method of the filter coefficient bitstream before using the non-differential decoding method to decode the filter coefficient bitstream in the bitstream.

In some embodiments, the bitstream may not include the syntax element bitstream indicating the encoding method of the filter coefficient bitstream.

In some embodiments, the bitstream may not include the syntax element bitstream indicating that the encoding method of the filter coefficient bitstream is the differential encoding method or the non-differential encoding method.

In some embodiments, the flag bit of the syntax element indicating that the encoding method of the filter coefficient bitstream is the differential encoding method or the non-differential encoding method may be 0 or 1.

In some embodiments, the non-differential decoding method may be the exponential Golomb decoding method.

In some embodiments, the multiple sets of filter coefficients may be N sets of filter coefficients of the brightness component of the decoded frame, where N may be a positive integer less than or equal to 25.

In some embodiments, the multiple sets of filter coefficients may be filter coefficients calculated based on the CTU.

In some embodiments, each set of filter coefficients in the multiple sets of filter coefficients may include 13 values.

In some embodiments, the loop filter may be a nonlinear loop filter. The processor 41 may be further configured to use the non-exponential Golomb decoding method to decode the bitstream of the clip index parameter in the bitstream to obtain the clip index parameter of the loop filter.

In some embodiments, the value of the clip index parameter may be an integer between 0-3.

In some embodiments, the number of decoding bits of the non-exponential Golomb decoding method may not be more than four.

In some embodiments, the non-exponential Golomb decoding method may be a fixed-length code decoding method, a unary decoding method, or a truncated unary decoding method.

In some embodiments, the non-exponential Golomb decoding method may be the fixed-length code decoding method, and the number of coding bits of the fixed-length code decoding method may be 2.

In some embodiments, the non-exponential Golomb decoding method may be the truncated unary decoding method, and the number of coding bits of the truncated unary decoding method may not be greater than 3.

In some embodiments, one clip index parameter may correspond to one loop filter clip parameter, and one loop filter clip parameter may correspond to one filter coefficient in the multiple sets of filter coefficients. The loop filter may be performed based multiple loop filter clip parameters and multiple sets of filter coefficients.

In some embodiments, the clip index parameter may include the brightness clip index parameter of the brightness component of the decoded frame and the chrominance clip index parameter of the chrominance component of the decoded frame. The brightness clip index parameter may correspond to the brightness loop filter clip parameter of the brightness component of the decoded frame, and the chrominance clip index parameter may correspond to the chrominance loop filter clip parameter of the chrominance component of the decoded frame. When the brightness clip index parameter is the same as the chrominance clip index parameter, the brightness loop filter clip parameter may be the same as the chrominance loop filter clip parameter.

In some embodiments, the brightness loop filter clip parameter and the chrominance loop filter clip parameter may be parameters selected from the same parameter list.

In some embodiments, the parameter list may include at least one of the following values: 1024, 181, 32, or 6.

FIG. 18 is a schematic block diagram of another loop filtering device 80 at the decoding end according to an embodiment of the present disclosure. In some embodiments, the loop filtering device 50 may correspond to the loop filtering method 700. In some embodiments, the loop filtering device 50 may also correspond to the loop filtering method in which the loop filtering methods 600 and 700 are combined, or the loop filtering method 800.

As shown in FIG. 18, the loop filtering device 50 includes a processor 51 and a memory 52.

The memory 52 may store programs, and the processor 51 may be configured to execute the programs stored in the memory to obtain the loop filter bitstream, and use the non-exponential Golomb decoding method to decode the bitstream of the clip index parameter in the bitstream to obtain the clip index parameter of the loop filter.

In some embodiments, the value of the clip index parameter may be an integer between 0-3.

In some embodiments, the number of decoding bits of the non-exponential Golomb decoding method may not be more than four.

In some embodiments, the non-exponential Golomb decoding method may be a fixed-length code decoding method, a unary decoding method, or a truncated unary decoding method.

In some embodiments, the non-exponential Golomb decoding method may be the fixed-length code decoding method, and the number of coding bits of the fixed-length code decoding method may be 2.

In some embodiments, the non-exponential Golomb decoding method may be the truncated unary decoding method, and the number of coding bits of the truncated unary decoding method may not be greater than 3.

In some embodiments, the processor 51 may be further configured to decode the indication information indicating the number of filter coefficient sets in the bitstream and determine that there are multiple sets of filter coefficients, and use the non-differential decoding method to decode a filter coefficient bitstream in the bitstream to obtain multiple sets of filter coefficients.

In some embodiments, the processor 51 may be configured to not decode the encoding method of the filter coefficient bitstream before using the non-differential decoding method to decode the filter coefficient bitstream in the bitstream.

In some embodiments, the bitstream may not include the syntax element bitstream indicating the encoding method of the filter coefficient bitstream.

In some embodiments, the bitstream may not include the syntax element bitstream indicating that the encoding method of the filter coefficient bitstream is the differential encoding method or the non-differential encoding method.

In some embodiments, the flag bit of the syntax element indicating that the encoding method of the filter coefficient bitstream is the differential encoding method or the non-differential encoding method may be 0 or 1.

In some embodiments, the non-differential decoding method may be the exponential Golomb decoding method.

In some embodiments, the multiple sets of filter coefficients may be N sets of filter coefficients of the brightness component of the decoded frame, where N may be a positive integer less than or equal to 25.

In some embodiments, the multiple sets of filter coefficients may be filter coefficients calculated based on the CTU.

In some embodiments, each set of filter coefficients in the multiple sets of filter coefficients may include 13 values.

In some embodiments, one clip index parameter may correspond to one loop filter clip parameter, and one loop filter clip parameter may correspond to one filter coefficient in the multiple sets of filter coefficients. The loop filter may be performed based multiple loop filter clip parameters and multiple sets of filter coefficients.

In some embodiments, the clip index parameter may include the brightness clip index parameter of the brightness component of the decoded frame and the chrominance clip index parameter of the chrominance component of the decoded frame. The brightness clip index parameter may correspond to the brightness loop filter clip parameter of the brightness component of the decoded frame, and the chrominance clip index parameter may correspond to the chrominance loop filter clip parameter of the chrominance component of the decoded frame. When the brightness clip index parameter is the same as the chrominance clip index parameter, the brightness loop filter clip parameter may be the same as the chrominance loop filter clip parameter.

In some embodiments, the brightness loop filter clip parameter and the chrominance loop filter clip parameter may be parameters selected from the same parameter list.

In some embodiments, the parameter list may include at least one of the following values: 1024, 181, 32, or 6.

Figure 19:
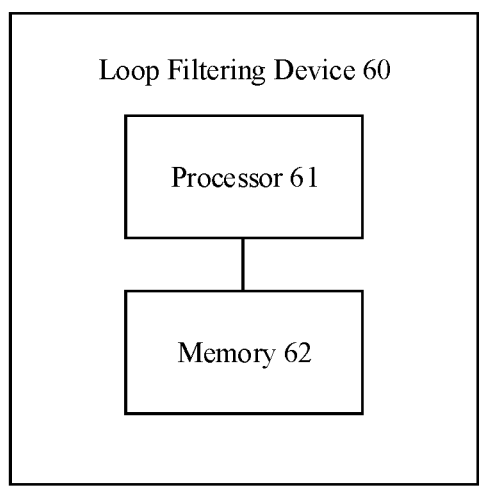
FIG. 19 is a schematic diagram of a non-linear loop filtering device according to an embodiment of the present disclosure.

FIG. 19 shows a schematic block diagram of a nonlinear loop filtering device 60 according to an embodiment of the present disclosure. The loop filtering device 60 may be disposed in a video encoding device, or it may be disposed in a video decoding device.

As shown in FIG. 19, the nonlinear loop filtering device 60 includes a processor 61 and a memory 62.

The memory 62 may store programs, and the processor 61 may be configured to execute the programs stored in the memory to determine the loop filter clip parameter of the brightness component and the loop filter clip parameter of the chrominance component of the image frame, where the loop filter clip parameter of the brightness component and the loop filter clip parameter of the chrominance component may be parameters selected from the same parameter list.

In some embodiments, the parameter list may include at least one of the following values: 1024, 181, 32, or 6.

In some embodiments, the processor 61 may be configured to determine the brightness clip index parameter of the brightness component and the chrominance index parameter of the chrominance component; determine the loop filter clip parameter of the brightness component based on the brightness clip index parameter, the chrominance index parameter corresponding to the loop filter clip parameter of the chrominance component. When the brightness clip index parameter is the same as the chrominance clip index parameter, the loop filter clip parameter of the chrominance component may be the same as the loop filter clip parameter of the brightness component.

In some embodiments, the image frame may be an encoded frame, and the nonlinear loop filtering device 60 may be disposed in a video encoding device. Alternatively, the image frame may be a decoded frame, and the nonlinear loop filtering device 60 may be disposed in a video decoding device.

An embodiment of the present disclosure further provides an electronic device. The electronic device may include the loop filtering device of the various embodiments of the present disclosure described above.

It should be understood that the processor of the embodiment of the present application may be an integrated circuit chip with signal processing capability. In an implementation process, steps of the foregoing method embodiments may be completed by using an integrated logical circuit of hardware in the processor or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general-purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage medium in the art, such as a random-access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor.

It can be appreciated that, a terminal or an electronic device in an embodiment of the present application may further include a memory, and the memory may be either volatile memory or nonvolatile memory, or may include both volatile and nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random-access memory (RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification aims to include but is not limited to these memories and any memory of another proper type.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method in the embodiments shown in FIG. 6 to FIG. 14.

An embodiment of the present application further provides a computer program including instructions that, when executed by a computer, cause the computer to execute the method of the embodiments shown in FIG. 6 to FIG. 14.

An embodiment of the present application further provides a chip including an input and output interface, at least one processor, at least one memory and a bus, where the at least one memory is configured to store an instruction, the at least one processor is configured to call an instruction in the at least one memory to execute the method of the embodiments shown in FIG. 6 to FIG. 14.

Those of ordinary skill in the art may be aware that, units and algorithm steps of the examples described in the embodiments disclosed in this paper may be implemented by electronic hardware, or a combination of computer software and the electronic hardware. Whether these functions are executed in hardware or software mode depends on the specific applications and design constraint conditions of the technical solution. Those skilled in the art may implement the described functions by using different methods for each specific application, but this implementation should not be considered to be beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated herein.

In the several embodiments provided in the present application, it should be understood that the disclosed system, apparatus, and method may be implemented in another manner. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separated. The components displayed as units may or may not be physical units, that is, may be located in one place or may also be distributed to multiple network units. Some or all of the units may be selected according to actual needs to achieve the objectives of the solution in the disclosure.

In addition, each functional unit in each embodiment of the present disclosure may be integrated into one processing unit, or each unit may exist alone physically, or two or more units may be integrated in one unit.

If the integrated units are realized as software functional units and sold or used as independent products, the integrated units may be stored in a computer-readable storage medium. Based on such understanding, the portion of the technical solution of the present disclosure that contributes to the current technology, or some or all of the disclosed technical solution may be implemented as a software product. The computer software product may be storage in a non-transitory storage medium, including instructions or codes for causing a computing device (e.g., personal computer, server, or network device, etc.) to execute some or all of the steps of the disclosed methods. The storage medium may include any suitable medium that can store program codes or instruction, such as at least one of a U-disk (e.g., flash memory disk), a mobile hard disk, a read-only memory (ROM), a random-access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. A loop filtering method comprising:
   determining clip index parameters of a loop filter; and
   encoding the clip index parameters by using a non-exponential Golomb encoding method;
   wherein the clip index parameters include:
      a first clip index parameter for brightness component, a first clip parameter for the brightness component being selected from a parameter list based on the first clip index parameter, and
      a second clip index parameter for chrominance component, a second clip parameter for the chrominance component being selected from the parameter list based on the second clip index parameter.

2. The method of claim 1, wherein:
   each of the clip index parameters is an integer value that is either 0, 1, 2, or 3.

3. The method of claim 1, wherein:
   a number of coding bits of the non-exponential Golomb encoding method is not more than 4.

4. The method of claim 1, wherein:
   the non-exponential Golomb encoding method is a fixed-length code encoding method, a unary encoding method, or a truncated unary encoding method.

5. The method of claim 4, wherein:
   the non-exponential Golomb encoding method is the fixed-length code encoding method, and the number of coding bits of the fixed-length code encoding method is 2.

6. The method of claim 4, wherein:
   the non-exponential Golomb encoding method is the truncated unary encoding method, and the number of coding bits of the truncated unary encoding method is not more than 3.

7. The method of claim 1, wherein determining the clip index parameters of the loop filter includes:
   calculating a rate-distortion (RD) cost of an encoded frame based on the non-exponential Golomb encoding method and determining the clip index parameters based on the RD cost before encoding the clip index parameters by using the non-exponential Golomb encoding method.

8. The method of claim 1, wherein:
   a rate-distortion (RD) cost of an encoded frame is not calculated based on the exponential Golomb encoding method before the non-exponential Golomb encoding method is used to encode the clip index parameters.

9. The method of claim 1, wherein:
   the parameter list contains a plurality of values including at least one of 4, 32, or 1024.

10. A loop filtering method comprising:
    obtaining a bitstream of a loop filter; and
    decoding the bitstream to obtain clip index parameters of the loop filter by using a non-exponential Golomb decoding method;
    wherein the clip index parameters include:
       a first clip index parameter for brightness component, a first clip parameter for the brightness component being selected from a parameter list based on the first clip index parameter, and
       a second clip index parameter for chrominance component, a second clip parameter for the chrominance component being selected from the parameter list based on the second clip index parameter.

11. The method of claim 10, wherein:
    each of the clip index parameters is an integer value that is either 0, 1, 2, or 3.

12. The method of claim 10, wherein:
    a number of coding bits of the non-exponential Golomb decoding method is not more than 4.

13. The method claim 10, wherein:
    the non-exponential Golomb decoding method is one of a fixed-length code decoding method, a unary decoding method, or a truncated unary decoding method.

14. The method of claim 13, wherein:
    the non-exponential Golomb decoding method is the fixed-length code decoding method, and the number of coding bits of the fixed-length code encoding method is 2.

15. The method of claim 13, wherein:
    the non-exponential Golomb decoding method is the truncated unary decoding method, and the number of coding bits of the truncated unary decoding method is not more than 3.

16. The method claim 10 further comprising:
decoding indication information indicating a number of filter coefficient sets in the bitstream, and determining that there are multiple sets of filter coefficients; and
decoding a filter coefficient bitstream in the bitstream to obtain multiple sets of filter coefficients by using a non-differential decoding method.

17. The method of claim 16, wherein:
an encoding method of the filter coefficient bitstream is not decoded before the non-differential decoding method is used to decode the filter coefficient bitstream in the bitstream.

18. The method of claim 16, wherein:
the bitstream does not include a syntax element bitstream indicating the encoding method of the filter coefficient bitstream.

19. A bitstream generating method comprising:
determining clip index parameters of a loop filter; and
encoding the clip index parameters by using a non-exponential Golomb encoding method to generate a bitstream;
wherein the clip index parameters include:
a first clip index parameter for brightness component, a first clip parameter for the brightness component being selected from a parameter list based on the first clip index parameter, and
a second clip index parameter for chrominance component, a second clip parameter for the chrominance component being selected from the parameter list based on the second clip index parameter.

20. The method of claim 19, wherein:
each of the clip index parameters is an integer value that is either 0, 1, 2, or 3.

\* \* \* \* \*